US010999506B1

(12) United States Patent
Sorgi et al.

(10) Patent No.: US 10,999,506 B1
(45) Date of Patent: *May 4, 2021

(54) GENERATING MOTION EXTRACTED IMAGES

(71) Applicant: Amazon Technologies, Inc., Seattle, WA (US)

(72) Inventors: Lorenzo Sorgi, Seattle, WA (US); Eliezer Rosengaus, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/698,547

(22) Filed: Nov. 27, 2019

Related U.S. Application Data

(63) Continuation of application No. 15/831,253, filed on Dec. 4, 2017, now Pat. No. 10,498,963.

(51) Int. Cl.
| | |
|---|---|
| *H04N 5/232* | (2006.01) |
| *H04N 5/235* | (2006.01) |
| *H04N 5/355* | (2011.01) |
| *G06T 5/00* | (2006.01) |
| *G06T 7/13* | (2017.01) |
| *G06T 7/215* | (2017.01) |
| *G06T 5/50* | (2006.01) |

(52) U.S. Cl.
CPC ......... *H04N 5/23267* (2013.01); *G06T 5/009* (2013.01); *G06T 5/50* (2013.01); *G06T 7/13* (2017.01); *G06T 7/215* (2017.01); *H04N 5/2355* (2013.01); *H04N 5/35536* (2013.01); *G06T 2207/20208* (2013.01)

(58) Field of Classification Search
CPC .......... C08L 23/06; C08L 67/02; C08L 33/10; C08L 33/26; C08L 2205/03; C08L 2205/08; C08F 8/48; C08F 120/06; C08F 8/12; C08F 8/14; C08F 230/02; C08F 8/00; C08F 8/32; C08G 81/021; G06T 2207/10024; G06T 2207/10028; G06T 2207/10144; G06T 2207/20208; G06T 2207/30232; G06T 5/003; G06T 5/009; G06T 5/50; G06T 7/11; G06T 7/13; G06T 7/162; G06T 7/215; H04N 5/23267; H04N 5/2355; H04N 5/35536; H04N 5/35581
See application file for complete search history.

(56) References Cited

U.S. PATENT DOCUMENTS

| 10,339,656 B1* | 7/2019 | Le ..................... G06T 7/0042 |
| 2007/0040928 A1* | 2/2007 | Jung ................... H04N 1/2166 |
| | | 348/362 |
| 2017/0278289 A1* | 9/2017 | Marino .............. G06Q 30/0276 |

* cited by examiner

*Primary Examiner* — Manuchehr Rahmjoo
(74) *Attorney, Agent, or Firm* — Athorus, PLLC

(57) ABSTRACT

Described are systems, methods, and apparatus for generating motion extracted images having a high dynamic range ("HDR") based on image data obtained from one or more image sensors at different times. The implementations described herein may be used with a single image sensor or camera that obtains images at different exposures sequentially in time. The images may be processed to detect an object moving within the field of view and pixel information corresponding to that moving object extracted. The non-extracted image data may then be combined to produce a motion extracted HDR image that is substantially devoid of the moving object.

20 Claims, 13 Drawing Sheets

GENERATING MOTION EXTRACTED IMAGES

PRIORITY CLAIM

This application is a continuation of U.S. patent application Ser. No. 15/831,253, filed Dec. 4, 2017, and titled "Motion Extracted High Dynamic Range Images," the contents of which are incorporated herein by reference.

BACKGROUND

Today, imaging devices, such as digital cameras, are frequently used for conducting surveillance or monitoring operations. For example, digital cameras are often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are commonplace in financial settings such as banks or casinos, where money changes hands in large amounts or at high rates of speed.

When conducting surveillance or monitoring operations, digital cameras may be aligned and configured to capture image data such as still or moving images of actions or events occurring within their respective fields of view. Information regarding the captured image data or the observed actions or events may be subjected to further analysis to identify aspects, elements or features of the content expressed therein. In performing such operations, digital cameras may be utilized alone or in groups and objects may be tracked as they move between fields of views of different cameras.

In environments with varying lighting conditions and moving objects (e.g., agents), such as materials handling facilities, transportation centers, financial institutions or like structures in which different light sources, agents, machines, etc., are present in different areas, it may be difficult to determine events and/or monitor inventory due to excessive light and/or the movement of objects.

DETAILED DESCRIPTION

This disclosure describes a system, process, and apparatus for generating motion extracted images having a high dynamic range ("HDR") based on image data obtained from one or more image sensors at different times. The implementations described herein may be used with a single image sensor, or camera, that obtains images at different exposures sequentially in time, known as exposure bracketing.

As is known in HDR imaging, multiple images taken at different exposures may be combined to produce an HDR image. However, with traditional HDR systems that obtain images sequentially in time, if there is an object, such as an agent or machine, moving in the field of view of the image sensor as the images are generated, the object will appear blurred or ghosted when the different exposure images are combined to form the HDR image. In comparison, the disclosed implementations detect the object that moves between the different times at which the images are generated, extracts from the images the pixels representative of the moving object and then combines the images to produce a motion extracted HDR image that is substantially devoid of the object that is moving.

Extraction or elimination of moving objects from a resulting HDR image may be beneficial for inventory management. For example, motion extracted HDR images may be compared over a period of time to detect an event, such as an item pick (removal of an item from a location) or an item place (placement of an item at a location) by detecting the appearance or disappearance of an item from a location or position within the motion extracted HDR images. In such an example, movement of the object, such as the agent, is not necessary and may lead to false detection of events.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, banks, casinos, airports, or other facilities or combinations of facilities for performing one or more functions of materials (inventory) handling.

"Exposure" is used herein as it is understood in the art. Specifically, exposure refers to the amount of light per unit area (the image plane illuminance times the exposure time) reaching the image sensor, as determined by shutter speed, lens aperture, and sensor sensitivity (ISO) of an imaging device. Exposure is measured in lux seconds. An image, pixels of an image, or a region of an image is considered overexposed when the pixels of the region experience a loss of detail or data such that portions of the imaged object are not represented by the data and the brighter areas represented by the pixels cannot be distinguished from white. Similarly, an image, region, or pixels of an image are considered underexposed when there is a loss of shadow detail, that is, when dark areas are indistinguishable from black.

Figure 1:
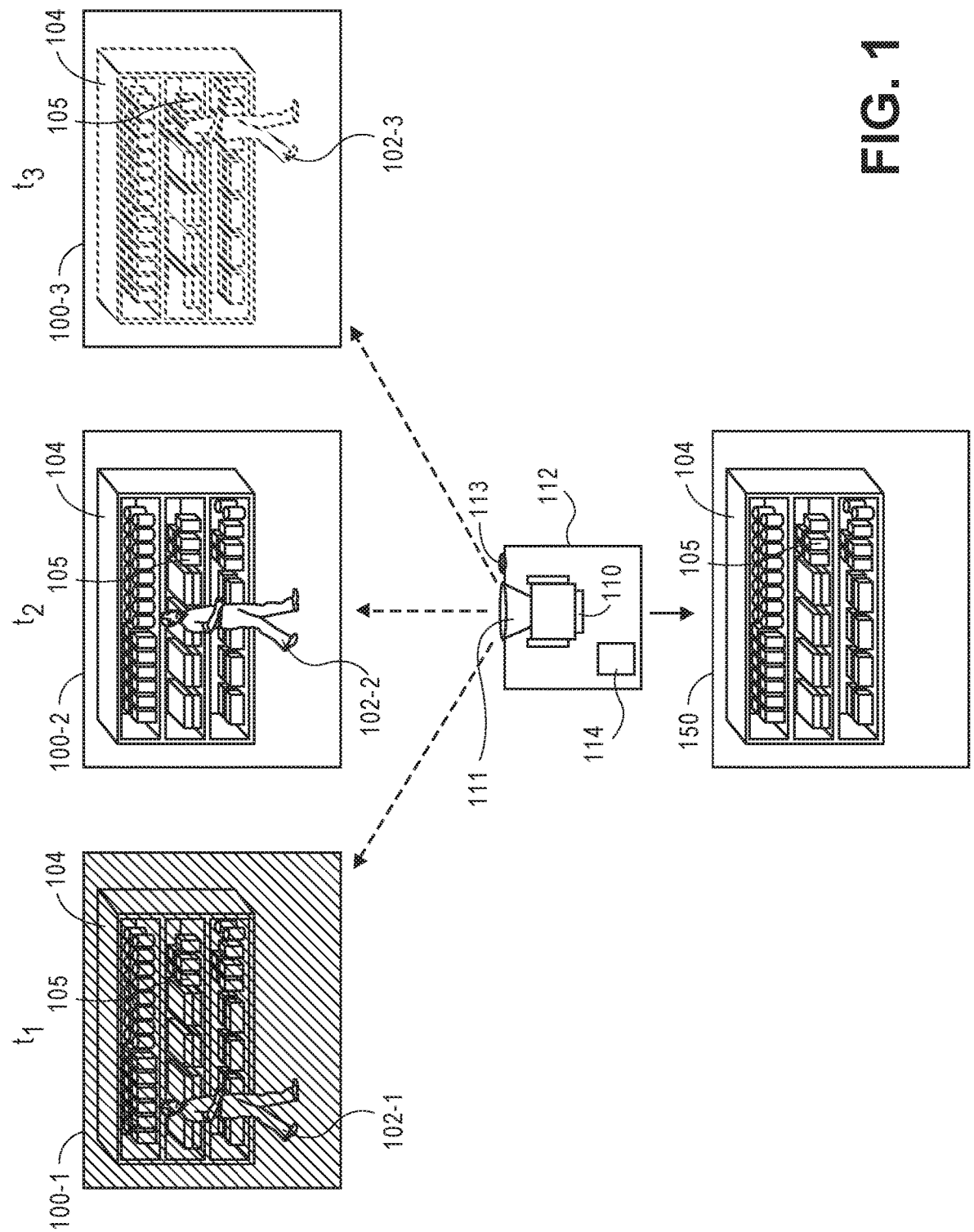
FIG. 1 illustrates a series of time sequenced images used to produce a motion extracted HDR image, in accordance with described implementations.

FIG. 1 illustrates a series of time sequenced images 100 used to produce a motion extracted HDR image 150, in accordance with described implementations. In this illustrated example, a single imaging device 112 that includes a lens 111, depth sensor 113, and imaging sensor 110 is utilized to generate image data of images generated at different exposures and sequentially in time. While the illustrated example includes a depth sensor 113, in other implementations, a depth sensor may not be included or may be separate from the imaging device 112. Likewise, the lens 111 and imaging sensor 110 may be any type of imaging device, including, but not limited to, a digital color camera, a digital color video camera, a monochrome digital camera, an infrared digital camera, a radiographic camera, etc. Likewise, the depth sensor 113 may be any type of depth sensor, including, but not limited to, a time-of-flight sensor, Sound Navigation And Ranging (SONAR), Light Detection And Ranging (LIDAR), etc.

In some implementations, the imaging device may include a computing component 114, coupled to the imaging sensor, that receives the image data representative of each image 100 formed by the imaging sensor 110 and performs the described implementations to produce a motion extracted HDR image 150. In other implementations, the image data of each image 100 may be transmitted by the imaging device 112 to one or more other computing systems, such as a remote computing system, that performs the described implementations to produce the motion extracted HDR image 150.

As illustrated in FIG. 1, the imaging device 112 generates images 100 of objects within a field of view of the imaging device 112. In this example, the imaging device 112 is positioned within a materials handling facility at a fixed position such that an inventory area 104 is within a field of view of the imaging device 112. In other implementations, the imaging device may be positioned on an underneath side of a shelf of the inventory location and oriented so that the shelf, or a portion thereof, and any images positioned on the viewable portion of the shelf are within the field of view of the imaging device 112.

In operation, the imaging device 112 generates a series of time sequenced images, each image having a different exposure. In the illustrated example, the series of time-sequenced images include three images 100-1, 100-2, and 100-3, each image generated at a different exposure. In this example, the first image 100-1 is generated at a low exposure, the second image 100-2 is generated at a middle exposure, and the third image is generated at a high exposure 100-3. Generating a series of images at different exposures is known in the art as exposure bracketing.

While the illustrated example includes three images 100-1, 100-2, 100-3 included in the series of time sequenced images, in other implementations, fewer or additional images may be included in the series of time-sequenced images.

In each of the images there are stationary objects, such as inventory items 105 and the inventory area 104. Likewise, in this example, there is a moving object 102, in this example an agent that is walking in front of the inventory area 104. As the first image 100-1 is generated at a first time ($t_1$) the agent 102-1 is at a first position. When the second image 100-2 is generated at a second time ($t_2$) which is different than the first time, the agent 102-2 is at a second position, and when the third image 100-3 is generated at the third time ($t_3$), the agent 102-3 is at a third position. The difference in the times ($t_1$, $t_2$, $t_3$) may be any time difference. For example, the difference between the first time ($t_1$) and the second time ($t_2$) may be 0.25 seconds. In other implementations, the difference between the times at which the images are generated may be shorter or longer.

In traditional systems, when the three images are combined to generate an HDR image, because the object 102 is at different positions in each image, the resulting HDR image will include the moving object and it will appear blurred or ghosted. Blurring or ghosting represented in an HDR image is often referred to as artifacts. In comparison, with the disclosed implementations, the motion extracted HDR image 150 may be produced from the three images 100-1, 100-2, and 100-3 such that the moving object is substantially eliminated from the motion extracted HDR image 150. As illustrated, in the resulting motion extracted HDR image, only the stationary objects, such as the inventory items 105 and the inventory area 104, are included in the resulting motion extracted HDR image 150.

Extraction of moving objects from the resulting motion extracted HDR image provides a technical advantage over traditional systems by eliminating blurs, ghosting, and representations of moving objects from the resulting HDR images. Such motion extracted HDR images may provide for improved inventory management by allowing comparison of different motion extracted HDR images over time to detect events, such as the addition or removal of items from the inventory location.

Figure 2:
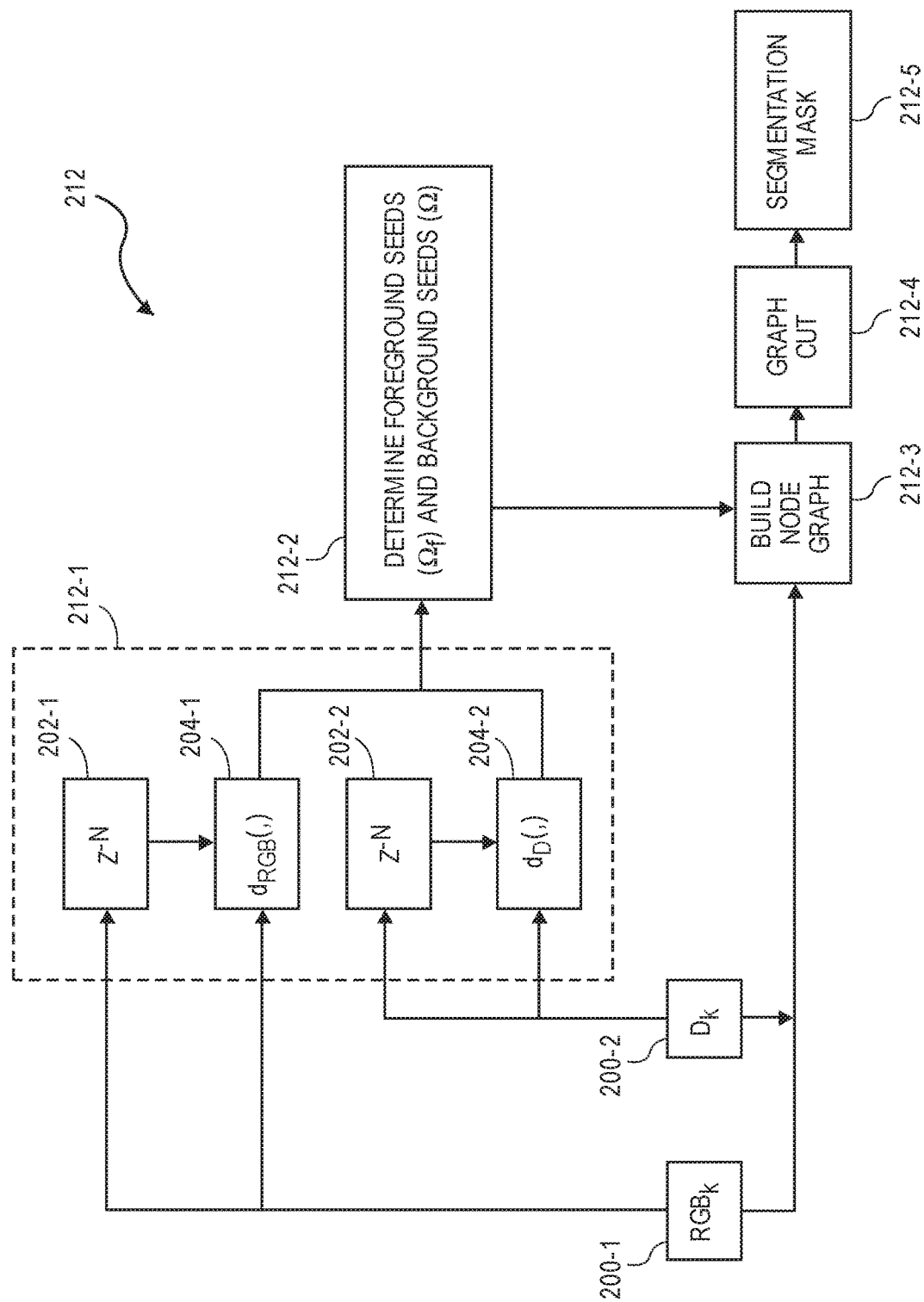
FIG. 2 is a block diagram illustrating generation of a segmentation mask, in accordance with described implementations.

FIG. 2 is a block diagram illustrating generation of a segmentation mask by a computing component 212, in accordance with described implementations. As discussed below, a segmentation mask may be applied to image data of a series of time sequenced images to extract image data corresponding moving objects to produce motion extracted images from the image data that is not extracted. After extraction of image data corresponding to moving objects, two or more motion extracted images may be combined to form a motion extracted HDR image that is substantially devoid of the moving object or artifacts. The generation of the segmentation mask may be performed by one or more computing components 212 that are included in the imaging device that generates the series of time sequenced images, such as the computing component 114 of imaging device 112 (FIG. 1). In other implementations, the computing component 212, or parts thereof, may be remote from the imaging device.

In some implementations, as illustrated, image data that includes both color image data 200-1 ($RGB_k$) and depth image data 200-2 ($D_k$) is generated by an imaging device and utilized by the computing component 212 to generate a segmentation mask that is applied to that image data to produce a motion extracted image. As part of the process, and as discussed further below with respect to FIG. 6, a first computing component 212-1 may receive a series of time sequenced images in the form of the image data 200-1, 200-2 and compare image data of a first image with corresponding image data of a second image that was taken at a prior point in time, as illustrated by delay function $Z^{-N}$ 202-1, 202-2. In some implementations, the delay function may result in a prior image (second image) generated at a same or similar exposure as the first image corresponding to the image data 200. By utilizing two images having similar exposures, the comparison of color data provides more reliable results.

Utilizing the color image data 200-1 of the first image and color image data from the prior image (second image), the first computing component 212-1 computes color similarity scores for one or more corresponding pixels of the two sets of image data using one or more comparison algorithms 204-1, such as $d_f(,)$. An example of $d_f(,)$ is discussed further below and may be computed as $\delta_f(p)=\|I_k(p)-I_{k-N}(p)\|$. Likewise, depth similarity scores are computed by the first computing component 212-1 for one or more corresponding pixels of the two sets of image data using one or more comparison algorithms 204-2, such as $d_D(,)$. An example of $d_D(,)$ is discussed further below and may be computed as $\delta_D(p)=D_k(p)-D_{k-N}(p)$.

Based on the computed similarity scores, a second computing component 212-2 determines one or more foreground seeds ($\Omega_f$) and/or one or more background seeds ($\Omega_b$). For example, the color similarity scores may be compared to a foreground color seed threshold and/or the depth similarity scores may be compared to a foreground depth seed threshold. If one or both of the thresholds or satisfied, the pixel of the first image data may be defined as a foreground seed for the first image. Likewise, the color similarity score may be compared to a background color seed threshold and/or the depth similarity score may be compared to a background depth seed threshold. If the color similarity score satisfies the background color seed threshold and/or the depth similarity score satisfies the background depth seed threshold, the pixel may be defined as a background seed for the first image. Determination of foreground seeds and backgrounds seeds is discussed in further detail below with respect to FIG. 6.

In addition to computing foreground and background seeds, a third computing component 212-3 utilizes the color image data 200-1, the depth image data 200-2, and the determined seeds to generate a node graph representative of the first image. Node graph generation is discussed in further detail below. Based on the foreground seed(s) and/or the background seed(s) and the strength of connections between nodes of the node graph, as discussed below, a fourth computing component 212-4, such as a graph cut algorithm, separates the graph between one or more foreground segments corresponding to pixels representative of moving objects and one or more background segments corresponding to pixels representative of stationary or background objects.

Finally, utilizing the foreground segment(s) of the graph, a segmentation mask is generated by the fifth computing component 212-5. As discussed below, the segmentation mask may be applied to the first image data to extract pixels representative of an object that is determined to be moving during the time at which the series of time sequenced images are generated.

The computing component 212 may generate a segmentation mask for each image of a series of time sequenced image so that foreground pixels are extracted from the image data of each of those time sequenced images. The non-extracted image data for each image may then be combined to produce a motion extracted HDR image that is substantially devoid of the moving object(s).

In other implementations, in addition to segmentation masks, and/or as an alternative thereto, other techniques may be used to determine pixels corresponding to moving objects that are to be extracted from the image data. For example, one or more edge detection, object detection, and/or depth processing algorithms may be used to determine a moving object and pixels corresponding or representative of that moving object determined and extracted, in accordance with the described implementations. For example, depth data may be considered to identify pixels of a foreground object, and those pixels may be extracted from the image.

Figure 3A:
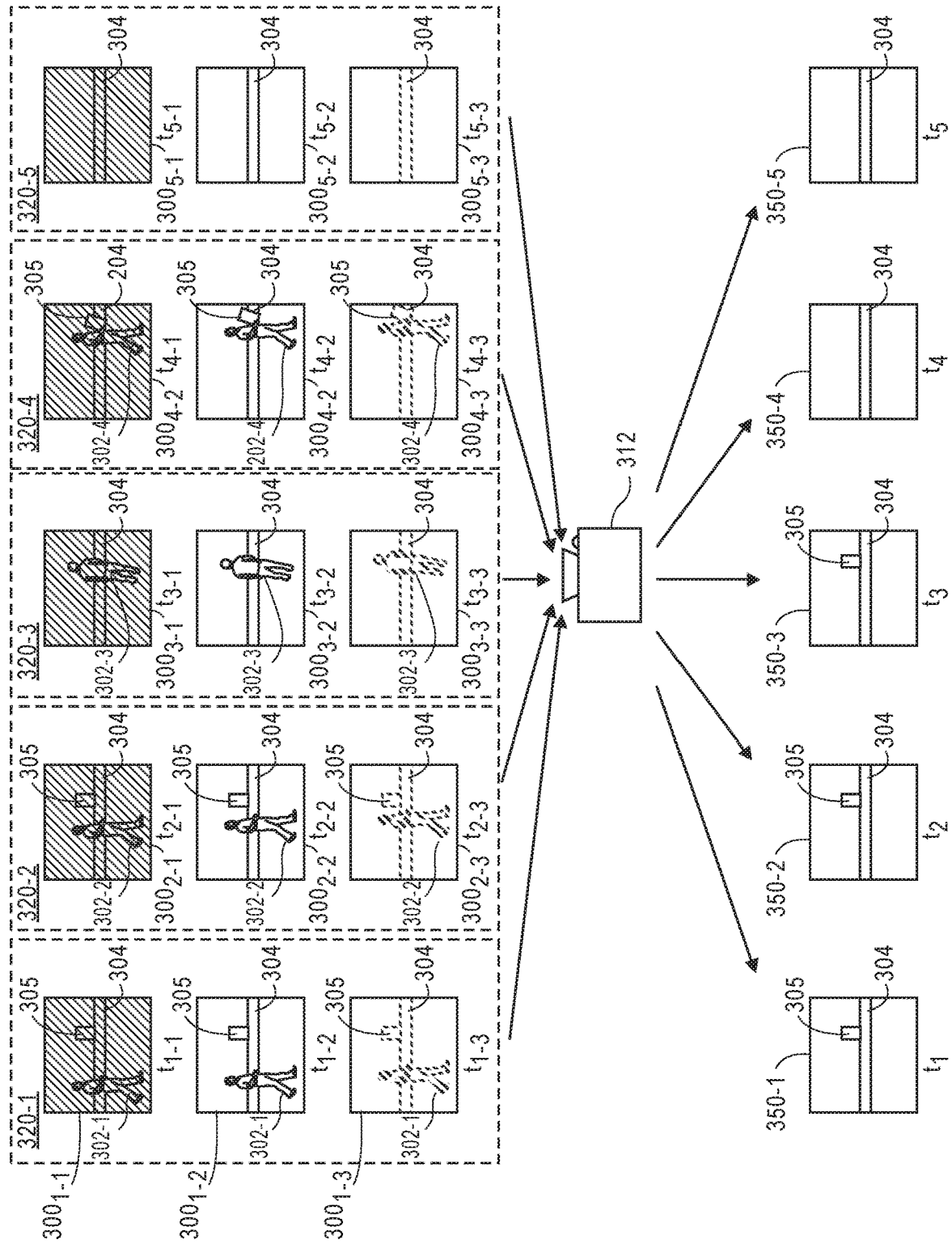
FIG. 3A illustrates sets of series of time sequenced images of an inventory location used to produce motion extracted HDR images to detect an event, in accordance with described implementations.

FIG. 3A illustrates sets 320 of series of time sequenced images of an inventory location used to produce motion extracted HDR images to detect an event, in accordance with described implementations. In the illustrated example, the imaging device 312 is positioned at a fixed location within a materials handling facility and oriented to include in the field of view of the imaging device 312 an inventory area that initially includes a shelf 304 and an inventory item 305.

The imaging device may generate series of exposure bracketed time-sequenced images 300 that are used to produce motion extracted HDR images 350. For example, a first set 320-1 of exposure bracketed time-sequenced images $300_{1-1}$, $300_{1-2}$, and $300_{1-3}$, obtained at different points in time $t_{1-1}$, $t_{1-2}$, and $t_{1-3}$ may be generated by the imaging device 312 and combined to produce a first motion extracted HDR image 350-1 representative of the inventory area at a first time ($t_1$). A second set 320-2 of exposure bracketed time-sequenced images $300_{2-1}$, $300_{2-2}$, and $300_{2-3}$, obtained at different points in time $t_{2-1}$, $t_{2-2}$, and $t_{2-3}$ may be generated by the imaging device 312 and combined to produce a second motion extracted HDR image 350-2 representative of the inventory area at a second time ($t_2$). A third set 320-3 of exposure bracketed time-sequenced images $300_{3-1}$, $300_{3-2}$, and $300_{3-3}$, obtained at different points in time $t_{3-1}$, $t_{3-2}$, and $t_{3-3}$ may be generated by the imaging device 312 and combined to produce a third motion extracted HDR image 350-3 representative of the inventory area at a third time ($t_3$). A fourth set 320-4 of exposure bracketed time-sequenced images $300_{4-1}$, $300_{4-2}$, and $300_{4-3}$, obtained at different points in time $t_{4-1}$, $t_{4-2}$, and $t_{4-3}$ may be generated by the imaging device 312 and combined to produce a fourth motion extracted HDR image 350-4 representative of the inventory area at a fourth time ($t_4$). A fifth set 320-5 of exposure bracketed time-sequenced images $300_{5-1}$, $300_{5-2}$, and $300_{5-3}$, obtained at different points in time $t_{5-1}$, $t_{5-2}$, and $t_{5-3}$ may be generated by the imaging device 312 and combined to produce a fifth motion extracted HDR image 350-5 representative of the inventory area at a fifth time ($t_5$).

As discussed above, the series of exposure bracket time sequenced images 320 of a set, such as the first set 320-1, may be generated at different points in time and combined to produce a motion extracted HDR image, such as motion extracted HDR image 350-1. While the images of a set may be separated in time by a first amount of time (such as 0.25 seconds), the different sets 320-1, 320-2, 320-3, 320-4, and 320-5 may be separated in time by a different amount of time (e.g., five seconds). In other implementations, the amount of time between sets may be shorter, longer, or equivalent to the amount of time between images of a set. Likewise, the resulting motion extracted HDR images 350 each may be considered as representative of respective single points in time, such as $t_1$, $t_2$, $t_3$, $t_4$, and $t_5$ and compared with other motion extracted HDR images generated at other points in time. For example, the first motion extracted image 350-1 representative of a first time ($t_1$), may be compared with a second motion extracted image 350-2 representative of a second time ($t_2$) to determine if an object has been added or removed from the inventory location.

In the illustrated example, in addition to the shelf 304 of the inventory area and the inventory item 305, a moving object 302, in this example an agent, is within the field of view of the imaging device 312. However, as illustrated in the motion extracted HDR images 350, the moving object 302 is not represented and only the stationary objects, such as the shelf 304 and the inventory item 305 are represented in the motion extracted HDR images. Specifically, in this example, in the first motion extracted HDR image 350-1, the moving object 302-1 of the agent is detected in the first set 320-1 of exposure bracketed images and extracted from the image data that forms the first motion extracted HDR image 350-1. Likewise, in the second motion extracted HDR image 350-2, the moving object 302-2 of the agent is detected in the second set 320-2 of exposure bracketed images and extracted from the image data that forms the second motion extracted HDR image 350-2. In the third motion extracted HDR image 350-3, the moving object 302-3 of the agent is detected in the third set 320-3 and extracted from the image data that forms the third motion extracted HDR image 350-3. In the third motion extracted HDR image 350-3, even though the agent is standing in front of the item 305, as illustrated by the images $300_{3-1}$, $300_{3-2}$, and $300_{3-3}$, after data representative of the moving object 302-3 (agent) is extracted, image data representative of the item 305 is added and the item 305 is represented in the motion extracted HDR image 350-3. Likewise, even though the agent 302 may be temporarily stationary, provided the agent does not remain stationary for more than a defined period of time, the agent 302 will still be detected as a moving object and extracted from the resulting motion extracted HDR image, such as motion extracted HDR image 350-3.

As discussed further below, in some implementations, regions of the images 300 that are extracted with the described implementations to eliminate moving objects may be filled with image data from another image, referred to herein as a baseline image, in which the objects represented in those regions are known to be stationary. For example, the regions corresponding to the object 302-3 removed from images $300_{3-1}$, $300_{3-2}$, and $300_{3-3}$ may be filled with image data from a baseline image in which the regions are known to not include a moving object. In one implementation, the extracted regions corresponding to object 302 removed from images $300_{3-1}$, $300_{3-2}$, and $300_{3-3}$ may be filled with image data from respective images $300_{1-1}$, $300_{1-2}$, and $300_{1-3}$ in which it is known there are no objects moving in those regions. In still other examples, the portions of the exposure bracketed images corresponding to moving object(s) may be extracted from the image data, the remaining image data from each of the exposure bracketed images of the set combined to form a motion extracted HDR image and image data from a different motion extracted HDR corresponding to the extracted region may be obtained and included in the motion extracted HDR image. As still another example, the regions of the images 300 determined to correspond to a moving object may be extracted and the remaining imaging data may be combined to form the motion extracted HDR image. In such an example, the region of the motion extracted HDR image corresponding to the moving object may not include any image data. While such a motion extracted HDR image may not be aesthetically pleasing to a human, if the image is being used for detection of an event at the inventory location, the motion extracted HDR image with less than all the image data may be sufficient.

Returning to FIG. 3A, as illustrated by the images $300_{4-1}$, $300_{4-2}$, and $300_{4-3}$ of the fourth set 320-4 of exposure bracketed images, the agent 300-4 has picked the inventory item 305 and is walking away with the inventory item. The described implementations will detect from the images $300_{4-1}$, $300_{4-2}$, and $300_{4-3}$ that both the agent 302 and the item 305 are moving. As a result, the motion extracted HDR image 350-4 generated from the fourth set 320-4 of exposure bracketed images will only include the inventory shelf 304 but will not include the agent 302 or the item 305, as they are both detected as moving objects. Likewise, the motion extracted HDR image 350-5 representative of the fifth set 320-5 of exposure bracketed images $300_{5-1}$, $300_{5-2}$, and $300_{5-3}$ will only include a representation of the shelf 304.

As discussed further below, by extracting moving objects to produce motion extracted HDR images 350, a simple pixel comparison or other image processing algorithm may be performed to compare adjacent in time motion extracted HDR images to determine if an event, such as an item pick or an item place, has occurred. For example, comparing first image data of the first motion extracted HDR image 350-1 with second image data of the second motion extracted HDR image 350-2 may be performed to determine that no event has occurred within the field of view of the imaging device 312. In comparison, comparing third image data of the third motion extracted HDR image 350-3 with fourth image data of the fourth motion extracted HDR image 350-4 may be performed to determine that an event of an item pick has occurred within the field of view of the imaging device 312 because the representation of the item 305 has changed between the two motion extracted HDR images.

Figure 3B:
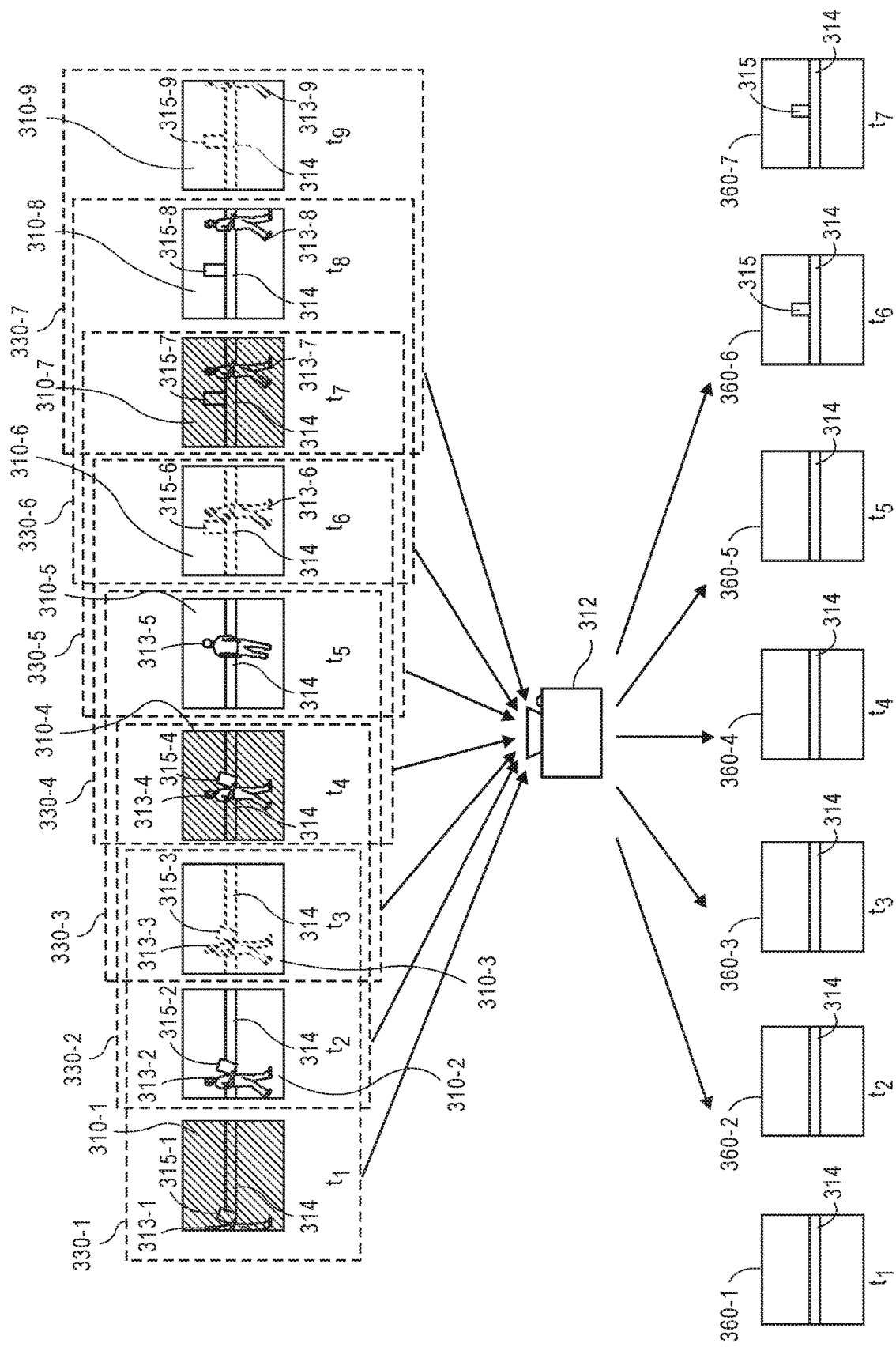
FIG. 3B is another example of sets of series of time sequenced images of an inventory location used to produce motion extracted HDR images to detect an event, in accordance with described implementations.

FIG. 3B illustrates another example of time sequenced images 310 of an inventory location used to produce motion extracted HDR images to detect an event, in accordance with described implementations. In the illustrated example, the imaging device 312 is positioned at a fixed location within a materials handling facility and oriented to include in the field of view of the imaging device 312 an inventory area that initially includes a shelf 314 and an inventory item 315.

The imaging device may generate series of exposure bracketed time-sequenced images 310 that are used to produce motion extracted HDR images 360. In comparison to FIG. 3A, in which each set of exposure bracketed time-sequenced images 310 include different images, in the example illustrated with respect to FIG. 3B, the sets of exposure bracketed time-sequenced images overlap and utilize one or more common images. For example, the series of exposure bracketed images 310 may include a low exposure first image 310-1 generated at a first time $t_1$, a middle exposure second image 310-2 generated at a second time $t_2$, a high exposure third image 310-3 generated at a third time $t_3$, a low exposure fourth image 310-4 generated at a fourth time $t_4$, a middle exposure fifth image 310-5 generated at a fifth time $t_5$, a high exposure sixth image 310-6 generated at a sixth time $t_6$, a low exposure seventh image 310-7 generated at a seventh time $t_7$, a middle exposure eighth image 310-8 generated at an eighth time $t_8$, a high exposure ninth image 310-9 generated at a ninth time $t_9$, etc. As discussed above, the difference in time between each of the exposure bracketed images may be approximately the same (e.g., 0.25 seconds) or may vary between images.

A first set 330-1 may include exposure bracketed time-sequenced images 310-1, 310-3, and 310-3 that are combined to produce a first motion extracted HDR image 360-1 representative of the inventory area at a first time ($t_1$). A second set 330-2 may include exposure bracketed time-sequenced images 310-2, 310-3, and 310-4 that are combined to produce a second motion extracted HDR image 360-2 representative of the inventory area at a second time ($t_2$). A third set 330-3 may include exposure bracketed time-sequenced images 310-3, 310-4, and 310-5 that are combined to produce a third motion extracted HDR image 360-3 representative of the inventory area at a third time ($t_3$). A fourth set 330-4 may include exposure bracketed time-sequenced images 310-4, 310-5, and 310-6 that are combined to produce a fourth motion extracted HDR image 360-4 representative of the inventory area at a fourth time ($t_4$). A fifth set 330-5 may include exposure bracketed time-sequenced images 310-5, 310-6, and 310-7 that are combined to produce a fifth motion extracted HDR image 360-5 representative of the inventory area at a fifth time ($t_5$). A sixth set 330-6 may include exposure bracketed time-sequenced images 310-6, 310-7, and 310-8 that are combined to produce a sixth motion extracted HDR image 360-6 representative of the inventory area at a sixth time ($t_6$). Finally, a seventh set 330-7 may include exposure bracketed time-sequenced images 310-7, 310-8, and 310-9 that are combined to produce a seventh motion extracted HDR image 360-7 representative of the inventory area at a seventh time ($t_7$).

As illustrated, one or more of the images 310 may be utilized in more than one set of exposure bracketed time sequenced images. For example, the second image 310-2 is used in both the first set 330-1 and the second set 330-2 of exposure bracketed time sequenced images. As another example, each of images 310-3 through 310-5 are used in three different sets of exposure bracketed images. Because the exposure level of the images is generated in a repeating pattern (e.g., low exposure, middle exposure, high exposure), the same images may be used in multiple sets and each set may continue to include all of the different exposure levels of the images. For example, the first set includes a low exposure first image 310-1, a middle exposure second image 310-2, and a high exposure third image 310-3. The second set includes the middle exposure second image 310-2, the high exposure third image 310-3, and a low exposure fourth image 310-4. The third set includes the high exposure third image 310-3, the low exposure fourth image 310-4, and a middle exposure fifth image 310-5.

As discussed above, the images 310 of each set 330 of exposure bracket time sequenced images 330 may be combined to produce a motion extracted HDR image, such as motion extracted HDR images 360-1 through 360-7. Similar to the example discussed with respect to FIG. 3A, the resulting motion extracted HDR images 360 each may be considered as representative of respective single points in time, such as $t_1$, $t_2$, $t_3$, $t_4$, $t_5$, $t_6$, and $t_7$ and compared with other motion extracted HDR images generated at other points in time. For example, the first motion extracted image 360-1 representative of a first time ($t_1$), may be compared with a second motion extracted image 360-2 representative of a second time ($t_2$) to determine if an object has been added or removed from the inventory location.

In this example, in addition to the shelf 314 of the inventory area, moving objects 313 and 315, in this example an agent and an inventory item, respectively, are within the field of view of the imaging device 312. However, as illustrated in the motion extracted HDR images 360, the objects 313 and 315, when moving, are not represented and only the objects that are stationary in each image of a set of exposure bracketed time sequenced images, such as the shelf 314, are represented in the motion extracted HDR images.

In this example, the moving objects 313-1, 313-2, 313-3, 315-1, 315-2, and 315-3 of the agent and the inventory item are detected in the first set 330-1 of exposure bracketed images 310-1, 310-2, and 312-3 and extracted from the image data that forms the first motion extracted HDR image 360-1. Likewise, the moving objects 313-2, 313-3, 313-4, 315-2, 315-3, and 315-4 of the agent and the inventory item are detected in the second set 330-2 of exposure bracketed images 310-2, 310-3, and 310-4 and extracted from the image data that forms the second motion extracted HDR image 360-2. The moving objects 313-3, 313-4, 313-5, 315-3, and 315-4 of the agent and the inventory item are detected in the third set 330-3 of exposure bracketed images 310-3, 310-4, and 310-5 and extracted from the image data that forms the third motion extracted HDR image 360-3. In the third set 330-3, even though the object of the inventory item is not visible in the image 310-5 of the third set 330-3, it is still considered moving and extracted based on a comparison of image data between each of the three images of the third set 330-3.

The moving objects 313-4, 313-5, 313-6, 315-4, and 315-6 of the agent and the inventory item are detected in the fourth set 330-4 of exposure bracketed images 310-4, 310-5, and 310-6 and extracted from the image data that forms the fourth motion extracted HDR image 360-4. In this set of images, even though the inventory item has been placed on the shelf, as illustrated in image 310-6, when comparing the exposure bracketed images of the set 330-4, the inventory item is still considered moving because it is not detected at a stationary position in each of the images 310-4, 310-5, 310-6 of the set 330-4.

In the fifth set 330-5, the moving objects 313-5, 313-6, 313-7, 315-6, and 315-7 of the agent and the inventory item are detected and extracted from the image data that forms the fifth motion extracted HDR image 360-5. Like the fourth set 330-4, even though the inventory item is stationary in two of the images 310-6 and 310-7, the corresponding image data may still be extracted as representative of a moving object because the inventory item is not visible in the image 310-5 of the fifth set 330-5, and thus, the corresponding pixels are determined to be foreground pixels and extracted.

In the sixth set 330-6, the only object detected to be moving in one or more of the images 310-6, 310-7, and 310-8 is the object 313-6, 313-7, and 313-8 of the agent. Accordingly, the moving object is extracted from the image data that forms the sixth motion extracted HDR image 360-6 and only the shelf 314 and the inventory item 315, both of which are now stationary in each of the images 310-6, 310-7, and 310-8 of the sixth set 330-6 are included in the motion extracted HDR image 360-6. In the seventh set 330-7, again the only object moving in one or more of the images 310-7, 310-8, and 310-9 is the object 313-7 and 313-8 of the agent. Accordingly, the moving object is extracted from the image data that forms the seventh motion extracted HDR image 360-7 and only the shelf 314 and the inventory item 315, both of which remain stationary in each of the images of the seventh set 330-7 are included in the motion extracted HDR image 360-7.

As discussed, in some implementations, regions of the images 310 that are extracted with the described implementations to eliminate image data representative of moving objects may be filled with image data from a baseline image in which the objects represented in those regions are known to be stationary. For example, the regions corresponding to the object 313-6, 313-7, and 313-8 may be removed from images 310-6, 310-7, and 310-8 and the remaining image data may be combined to form a motion extracted HDR image and image data from a different motion extracted HDR corresponding to the extracted region may be obtained and included in the motion extracted HDR image.

By extracting moving objects to produce motion extracted HDR images 360, a simple pixel comparison or other image processing algorithm may be performed to compare adjacent in time motion extracted HDR images to determine if an event, such as an item pick or an item place, has occurred. For example, comparing first image data of the first motion extracted HDR image 360-1 with second image data of the second motion extracted HDR image 360-2 may be performed to determine that no event has occurred within the field of view of the imaging device 312. In comparison, comparing third image data of the third motion extracted HDR image 360-3 with fourth image data of the fourth motion extracted HDR image 360-4 may be performed to determine that an event of an item pick has occurred within the field of view of the imaging device 312 because the representation of the item 315 has changed between the two motion extracted HDR images.

Figure 4:
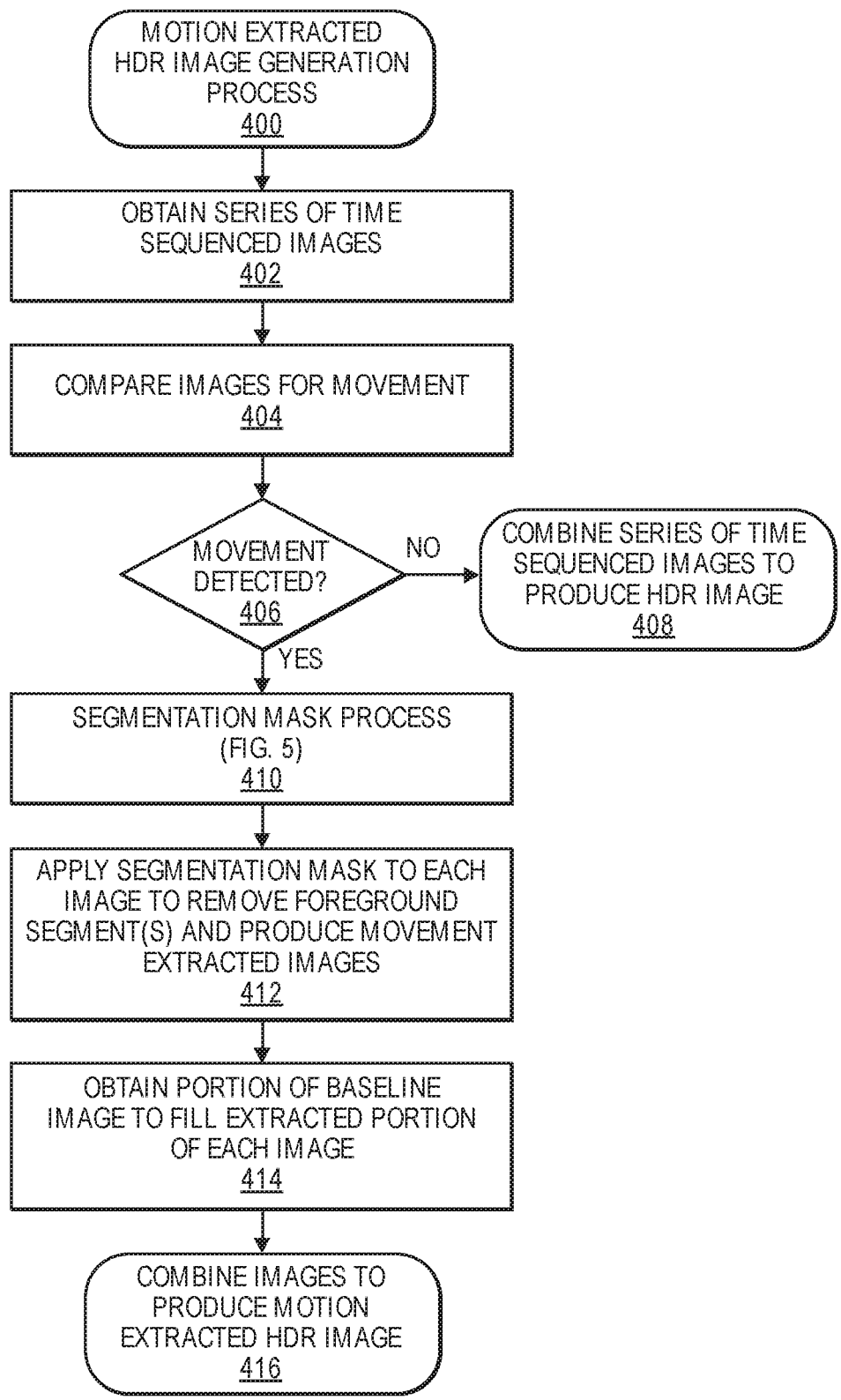
FIG. 4 is a flow diagram of an example motion extracted high dynamic range image creation process, in accordance with described implementations.

FIG. 4 is a flow diagram of an example motion extracted HDR image generation process 400, in accordance with described implementations. The example process 400 may be performed by a computing component included in the imaging device. Alternatively, the example process may be performed by one or more computing resources that are separate or remote from the imaging device that receive a series of time sequenced images from the computing device.

The example process 400 begins upon receipt of a series of time sequenced images, as in 402. As discussed above, the series of time sequenced images may be a series of exposure bracketed time sequenced images. However, in other implementations the series of time sequenced images may each have similar exposures. Likewise, any number of images may be included in the series of time sequenced images. As illustrated above, three or more images may be included in the series of time sequenced images. In other implementations, fewer or additional images may be included in the received series of time sequenced images.

Upon receipt of the series of time sequenced images, image data of two or more of the images are compared to determine if there is an object moving in the field of view of the imaging device that generated the images, as in 404. In some implementations, pixel data of a first image of the time sequenced images may be compared with pixel data of a second image of the time sequenced images to determine if the color and/or depth information included in the pixel data changes between the images. In some implementations, a change may be determined if the color information of one or more pixels changes by more than a defined amount. In other implementations, it may be required that a minimum number or group of adjacent pixels include color information that is different than the color information from another image in the series of time sequenced images. In still other examples, depth information between the first image and the second image may be compared to determine if there is an object moving in the field of view of the imaging device. In some implementations, the color information may be converted to grey-scale and grey-scale image data may be compared using one or more image processing algorithms to detect potential motion between images. For example, an edge detection or object detection algorithm may be utilized to detect potential movement between images of the set of time-sequenced images. In other implementations, changes in depth value between images may be utilized as an indication of potential portion between images.

Based on the compared image data, a determination is made as to whether movement of an object between a first time at which the first image is generated and a second time at which the second image is generated is detected, as in 406. If it is determined that no object movement is detected, the series of time sequenced images are combined to form an HDR image, as in 408. However, if it is determined that object movement between images is detected, a segmentation mask process is performed to generate a segmentation mask, as in 410. The segmentation mask process is discussed in more detail below with respect to FIG. 5.

As discussed below, in some implementations, a segmentation mask may be formed for each image of the series of images. In other implementations, a single segmentation mask may be formed for the series of time sequenced images. Upon formation of the segmentation mask, the segmentation mask may be applied to each image of the series of time sequenced images to extract image data corresponding to one or more foreground segments that are determined to represent a moving object, and the remaining image data forms a movement extracted image, as in 412. In some implementations, a different segmentation mask may be generated for each image of the series of time sequenced images and applied to the respective image, the foreground segment(s) of the image extracted, or a motion extracted image formed from each image that includes the portion of the image data that was not extracted. In other implementations, a single segmentation mask for the series of time sequenced images may be formed and applied to each image of the series of time sequenced images to extract the foreground segments. In still another example, a segmentation mask may be formed, the series of time sequenced images combined to form an HDR image, and then the segmentation mask may be applied to the HDR image to extract the image data of the HDR image corresponding to the foreground segment(s).

In some implementations, in addition to extracting the foreground segment(s) from the images, a portion of a baseline image corresponding to the extracted foreground segments may be obtained and used to replace the extracted image data, as in 414. A baseline image may be any image in which the portion of the image data to be utilized to fill the extracted image data is known to represent stationary objects. In some implementations, the baseline image may be an image obtained by the imaging device at a time when it is known that there is no movement of objects in a field of view of the imaging device. In other implementations, the baseline image may be an image from a prior series of time sequenced images in which it has been determined that the portion of the image to be utilized to fill the extracted image data represents stationary objects. In implementations in which foreground segments are extracted from exposure bracketed images, a prior image with a similar exposure may be utilized as the baseline image. In still other examples, image data from a prior motion extracted HDR image may be utilized to fill the portion of the extracted image data. Utilization of image data from a prior motion extracted HDR image will ensure that the image data used to fill the extracted portion does not represent a moving object because image data representative of a moving object has already been extracted from that prior motion extracted HDR image. In still other examples, image data from a baseline image may not be obtained and the example process 400 may proceed with the motion extracted images with regions of those images not having any image data. As discussed above, images with segments that do not include image data may be sufficient for use in detecting events occurring in the field of view of the imaging device.

Returning to FIG. 4, each motion extracted image of the series of time sequenced images, and image data from the portion of the baseline image, if obtained, are combined to form a motion extracted HDR image, as in 416.

Figure 5:
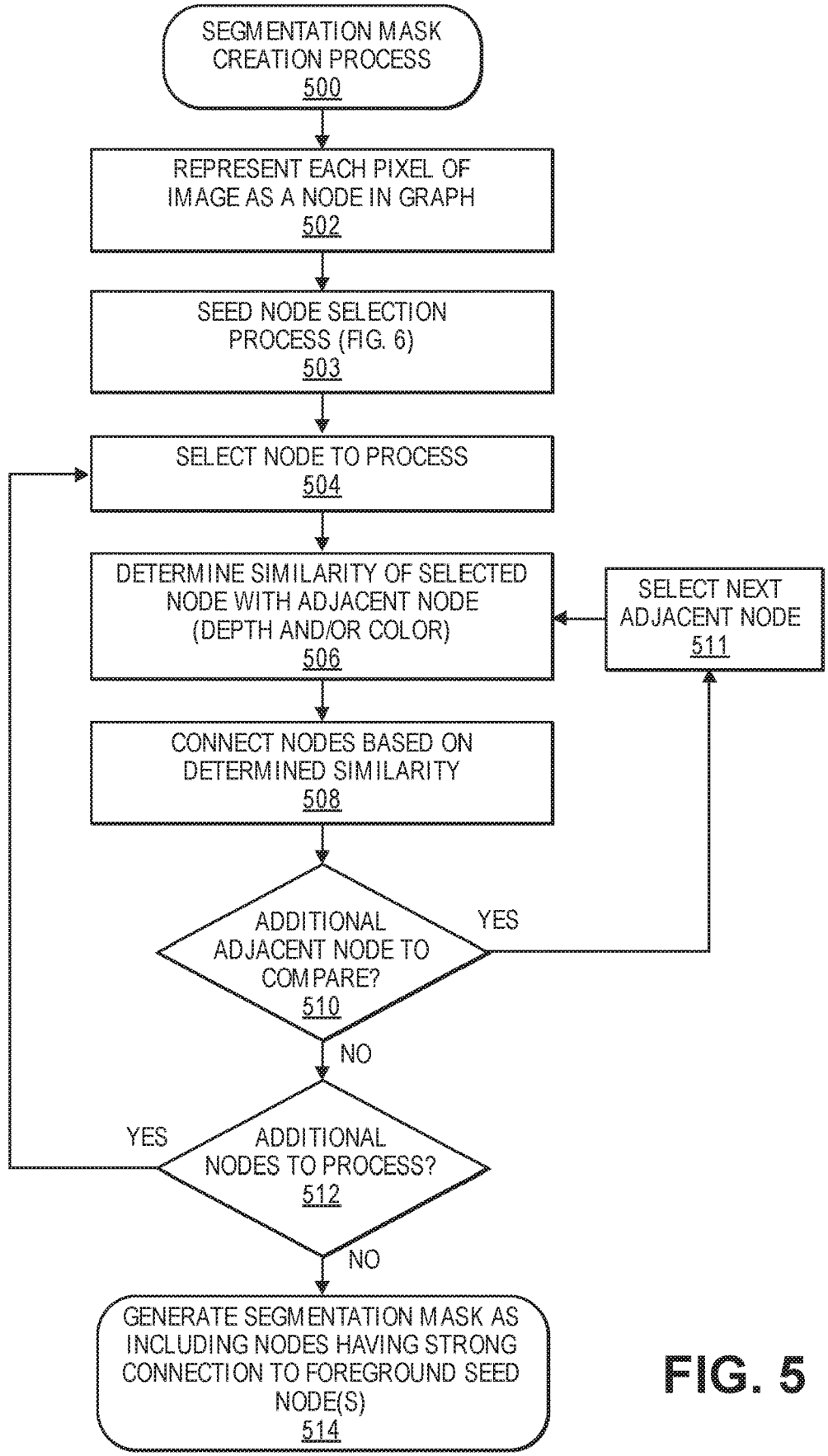
FIG. 5 is a flow diagram of an example segmentation mask creation process, in accordance with described implementations.

FIG. 5 is a flow diagram of an example segmentation mask creation process 500, in accordance with described implementations. The example process 500 may be performed for each image of a series of time sequenced images to generate a segmentation mask for that image. In other implementations, the example process 500 may be performed for a series of time sequenced images to form a single segmentation mask. The single segmentation mask may be applied to each image of the series of time sequenced images. Alternatively, a segmentation mask formed according to the example process 500 may be applied to an HDR image formed from a combination of the series of time sequenced images to extract data corresponding to a moving object(s) and form a motion extracted HDR image.

The example process 500 begins by representing each pixel of an image as a node in a node graph, as in 502. In some implementations, each pixel corresponds to a node in the graph. For example, if the image data of an image includes 100×100 pixels, the resulting node graph will include 100×100 nodes. In addition to forming a node graph, the seed node selection process is performed to determine one or more foreground seed nodes and/or one or more background seed nodes, as in 503. The seed node selection process is discussed in further detail below with respect to FIG. 6. The example process 500 also selects a node from the node graph to process, as in 504. The node may be randomly selected, selected sequentially, selected according to a defined pattern, or otherwise selected.

The selected node is then compared with an adjacent node in the node graph to determine a similarity score representative of a similarity between a pixel represented by the selected node and a pixel represented by the adjacent node, as in 506. For example, if the selected node is considered a first node, first pixel data of the first node may be compared to pixel data of the adjacent node and a similarity score determined indicating a similarity between the pixel data of the two pixels. The comparison of adjacent nodes may consider color information of the adjacent pixels, depth information of the adjacent pixels, or both color information and depth information of the adjacent pixels. In one implementation, a similarity score between two adjacent pixels may be determined as:

$$\delta_I(p_i,p_j)=\varnothing(I_k(p_i),I_k(p_j))$$

$$\delta_D(p_i,p_j)=\varnothing(I_k(p_i),I_k(p_j))$$

$$e(p_i,p_j)=(1-\alpha)\delta_I((p_i,p_j)+\alpha\delta_D(p_j,p_j))$$

where $p_i$ and $p_j$ are any two neighboring or adjacent pixels or nodes in the node graph, $\varnothing(a, b)$ is a user defined dissimilarity measure, and a is a blending factor used to control the weight of the depth and color information in the segmentation. In other implementations, similarity between pixels may be determined using other techniques. For example, object detection may be performed using one or more object detection and/or edge detection algorithms, and pixels determined to correspond to the same object may be assigned high similarity scores. In still other examples, if depth data is included in the information, adjacent pixels having depth data within a defined range of one another (e.g., less than a three percent difference) may be assigned a high similarity score.

Based on the determined similarity score between two adjacent nodes, a connection is established in the graph as representative of the determined similarity score, as in 508.

After assigning a similarity score to the connection between two adjacent nodes, a determination is made as to whether there are any other nodes adjacent to the node selected at block 504 for which a similarity score and connection are to be established, as in 510. If it is determined that there are additional adjacent nodes, a next adjacent node is selected, as in 511, and the example process 500 returns to block 506 and continues.

If it is determined that there are no adjacent nodes to compare with the node selected in block 504, a determination is made as to whether there are any additional nodes of the node graph to process, as in 512. If it is determined that there are additional nodes to process, the example process 500 returns to block 504, selects the next node, and continues.

If it is determined that there are no additional nodes to process, the graph is cut to form a segmentation mask that includes the foreground seed node(s), nodes having a strong connection to the foreground seed node(s), and to include nodes that have a strong connection to one or more of the nodes that have a strong connection with the foreground seed node(s), as in 514. For example, a graph cut algorithm, which is known in the art, may be used to cut the graph along the weak connections to separate nodes that have a strong connection to a foreground seed node from nodes that do not have a strong connection to a foreground seed node and/or a strong connection with a background seed node. For example, graph cut may consider the similarity score assigned to each connection between each node in the node graph and determine a path through the graph in which the connections are to be terminated or cut so that the graph can be separated between one or more foreground segments and one or more background segments. In one implementation, graph cut may determine a minimum difference between the similarity scores between foreground segment(s) of the graph that is cut compared to background segment(s) and terminate or cut connections to form the foreground and background segments such that a difference between the aggregate similarity scores of the segments is minimized. In other implementations, graph cut may optimize the segmentation of the graph based on other parameters. For example, graph cut may determine the lowest possible total score for different cuts along the graph. In such an example, the graph may be cut between nodes that produce the lowest possible total score.

As discussed further below, the foreground seed node(s) are nodes of the graph corresponding to pixels for which there is a high confidence that the nodes represent an object that is moving between the first time when the first image is generated and the second time when the second image is generated. Likewise, the background seed node(s) are nodes of the graph corresponding to pixels for which there is a high confidence that the nodes represent an object that is stationary between the first time when the first image is generated and the second time when the second image is generated.

Figure 6:
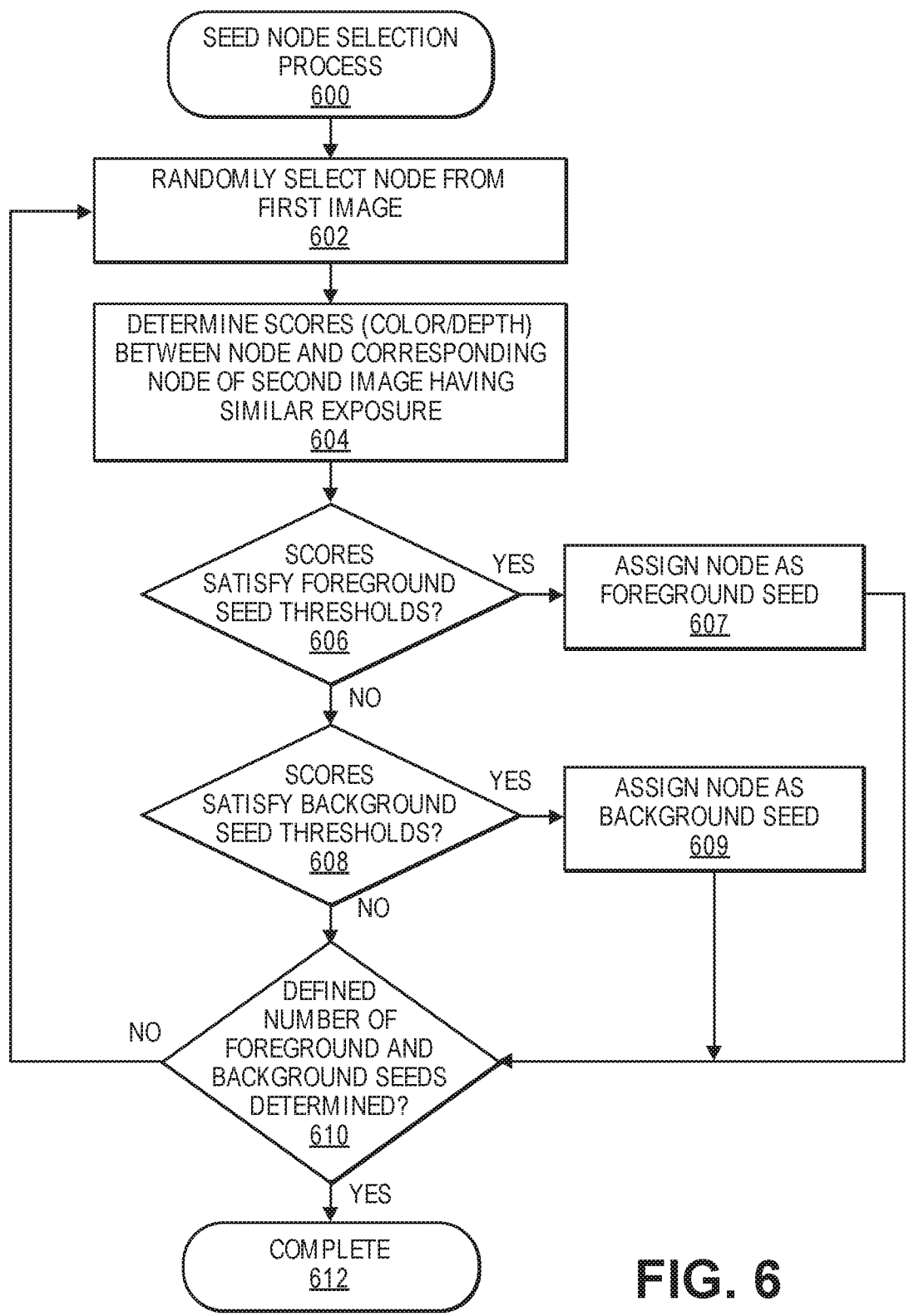
FIG. 6 is a flow diagram of an example seed node selection process, in accordance with described implementations.

FIG. 6 is a flow diagram of an example seed node selection process 600, in accordance with described implementations. As discussed above, a seed node is a node for which there is a high degree of confidence that the node is representative of a moving object, referred to herein as a foreground seed node, or representative of a stationary object, referred to herein as a background seed node. The seed node selection process begins by selecting a node from a node graph of a first image of the series of time sequenced images, as in 602. The node may be randomly selected, as indicated in the example 600, selected based on a defined pattern, sequentially selected, or selected based on one or more other factors.

Upon selection of a node corresponding to a pixel of a first image, pixel data of the pixel associated with that node is compared with pixel data of a corresponding pixel from a second image of the series of time sequenced images to determine a difference between the pixel data, as in 604. In some implementations, the second image may be a prior image having a similar exposure to the first image. For example, referring briefly back to FIG. 3B, if the first image is middle exposure image 310-5, the second image may be middle exposure image 310-2.

The compared pixel data may include color information, depth information, or both color information and depth information. A variety of techniques may be utilized to compare the pixel data to determine a similarity of the pixels between the two images.

In one implementation, foreground seed nodes and background seed nodes may be computed as:

$$p=(u,v)$$

$$\delta_I(p)=\|I_k(p)-I_{k-N}(p)\|$$

$$\delta_D(p)=D_k(p)-D_{k-N}(p)$$

$$\Omega_f=\{p_j:\delta_I(p_j)>th_{hI}\vee\delta_D(p_j)<th_{hD}\}$$

$$\Omega_b=\{p_j:\delta_I(p_j)<th_{lI}\vee\delta_D(p_j)<th_{lD}\}$$

where $\Omega_f$ and $\Omega_b$ represent foreground seed nodes and background seed nodes, respectively, and $th_{hI}$, $th_{hD}$, $th_{lI}$ and $th_{lD}$ are either user defined thresholds or adaptive thresholds determined from data collected from prior frames of image data. In some implementations, the depth score $\delta_D(p)$ is a signed function and a high foreground score requires the current pixel depth to be lower (closer to the camera) than the previous pixel depth, that is $\delta_D$ lower than a positive threshold.

As illustrated by the above equations, upon determining the difference between the image data of a pixel of the selected node compared to pixel data of a pixel of a corresponding node from a second image, a determination is made as to whether the color score $\delta_I(p)$ is greater than the foreground color seed threshold $th_{hI}$ and/or whether the depth score $\delta_D(p)$ is less than the foreground depth seed threshold $th_{hD}$, as in 606. In some implementations, both the color and depth thresholds must be satisfied before the node is defined as a foreground seed node. In other implementations, only one of the foreground seed thresholds needs to be satisfied for the node to be defined as a foreground seed node. If it is determined that the scores satisfy one or more foreground seed thresholds, the node is assigned as a foreground seed node, as in 607.

If it is determined that the scores do not exceed one or more foreground seed thresholds, a determination is made as to whether the color score $\delta_I(p)$ is less than the background color seed threshold $th_{lI}$ and/or whether the depth score $\delta_D(p)$ is greater than the background depth seed threshold $th_{lD}$, as in 608. In some implementations, both the color and depth thresholds must be satisfied before the node is defined as a background seed node. In other implementations, only one of the background seed thresholds need to be satisfied for the node to be defined as a background seed node. If it is determined that the scores satisfy one or more background seed thresholds, the node is assigned as a background seed node, as in 609. The foreground and background seed thresholds may the same or different.

After assigning the node as a foreground seed node, a background seed node, or not assigning the node as either, a determination is made as to whether a defined number of foreground seed nodes and background seed nodes have been defined, as in 610. In some implementations, only a single foreground seed node need be assigned. In other implementations, both at least one foreground seed node and at least one background seed node need to be defined. In still other examples, multiple foreground seed nodes and/or multiple background seed nodes may be required. If it is determined that a defined number of foreground seed nodes and/or background seed nodes have not been defined, the example process 600 returns to block 602 and continues. However, if it is determined that the defined number of foreground seed nodes and/or background seed nodes have been assigned, the example process 600 completes, as in 612.

Figure 7:
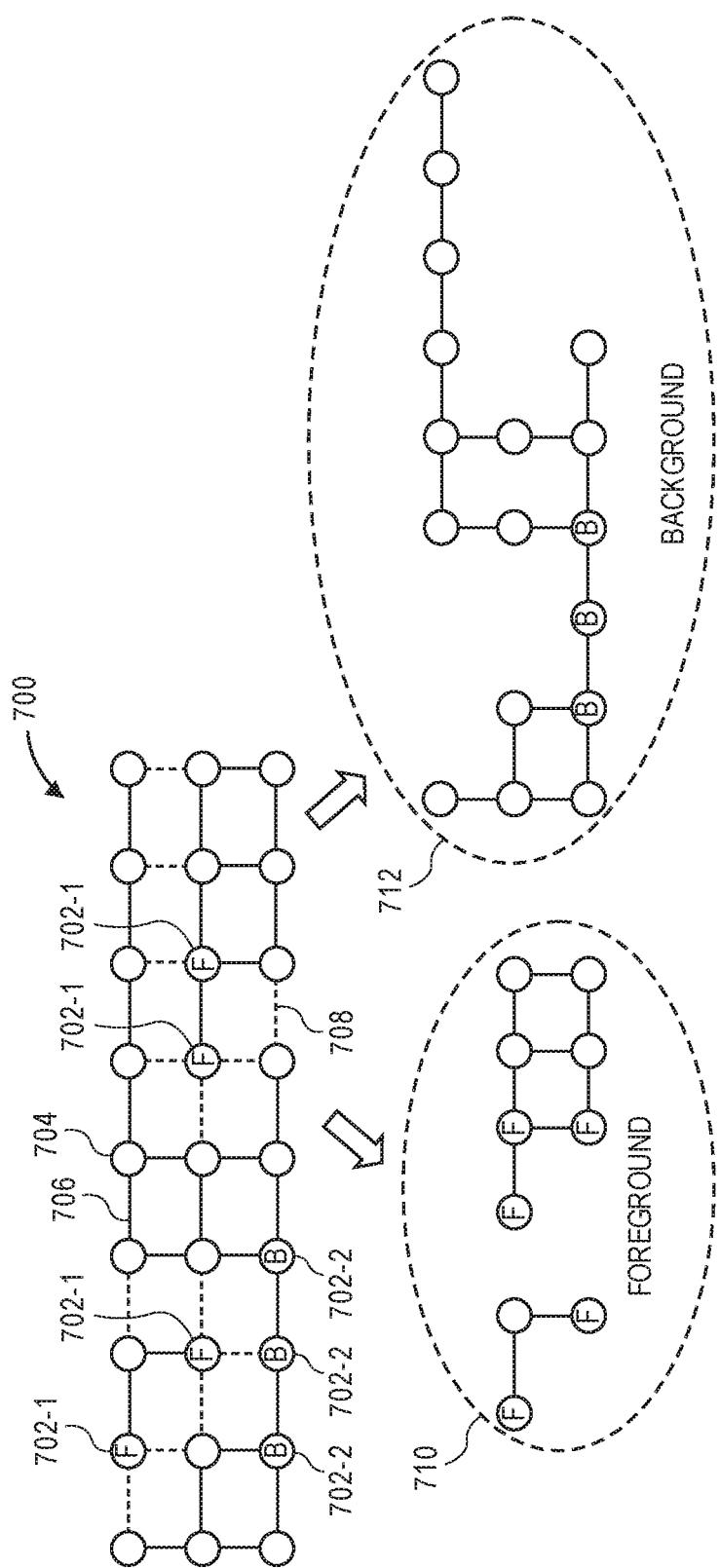
FIG. 7 illustrates a node graph produced for an image, in accordance with described implementations.

FIG. 7 illustrates a node graph 700 produced for an image, in accordance with described implementations. In this example, for purposes of discussion, the image includes 9×3 pixels and thus, a corresponding 9×3 nodes 704 of the node graph are formed. Utilizing the example process 600 (FIG. 6) nodes 702-1 are defined as foreground seed nodes and nodes 702-2 are defined as background seed nodes. Likewise, utilizing the example process 500 (FIG. 5), a strength or similarity score between each adjacent node is determined. In the illustrated example, the connections 706 illustrated as solid lines correspond to connections between nodes having a first high similarity scores, indicating a strong connection or high similarity between the adjacent nodes. In comparison, connections 708 illustrated as dashed lines correspond to connections between nodes having low similarity scores, indicating a weak connection of low similarity between the adjacent nodes.

Utilizing an algorithm, such as graph cut, a foreground segmentation mask 710 may be formed by selecting each of the foreground seed nodes 702-1 and extracting those foreground seed nodes. The graph cut algorithm will consider the similarity score between each connection and terminate or cut the graph along the weak connections 708, thereby separating the nodes corresponding to the foreground mask 710 from the background nodes 712. In some implementations, graph cut will separate the graph to minimize a difference between the similarity scores of one segment compared to similarity scores of another segment. In other implementations, other factors may be considered when separating or cutting the node graph.

Figure 8:
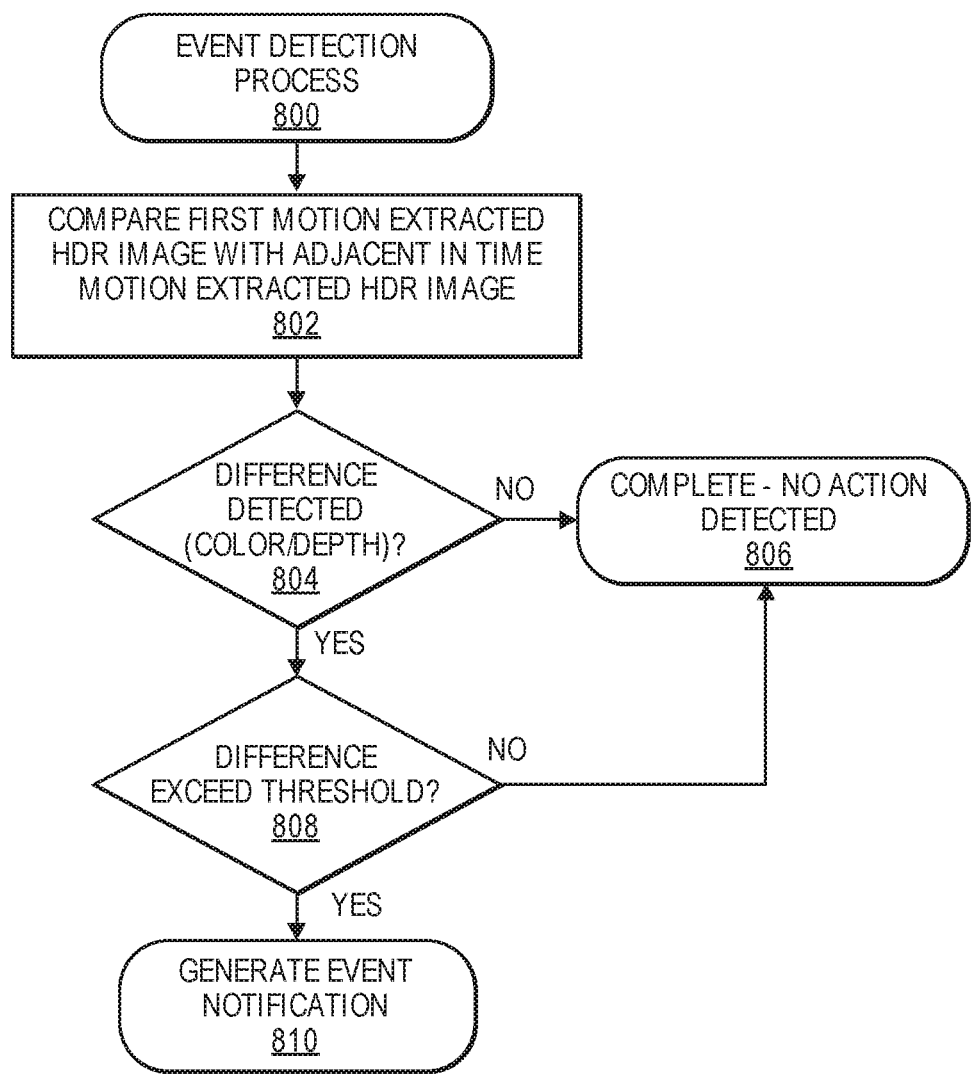
FIG. 8 is a flow diagram of an event detection process, in accordance with described implementations.

FIG. 8 is a flow diagram of an event detection process 800, in accordance with described implementations. The event detection process may be utilized to quickly and efficiently detect an event, such as an item pick or an item place that occurred within the field of view of an imaging device.

The example process 800 begins by comparing a first motion extracted HDR image with an adjacent in time motion extracted HDR image, as in 802. Because the motion extracted HDR images only represent stationary objects, basic imaging comparison algorithms may be utilized to determine if there is a difference, such as a pixel color value difference or depth difference, between the two motion extracted HDR images.

Based on the comparison of the two motion extracted HDR images, a determination is made as to whether a difference between the two images has been detected, as in 804. If no difference is detected, then no event has occurred between the image of the first motion extracted HDR image and the adjacent in time motion extracted HDR image, and the process completes, as in 806.

If it is determined that a difference has been detected, a determination is made as to whether that difference exceeds a threshold, as in 808. The threshold may be any value that must be exceeded before it is determined that an event has been detected based on a comparison of the two motion extracted HDR images. Utilizing a threshold may allow for some variation between the images resulting from different exposures, lighting changes, vibrations, etc. The threshold may vary for different imaging devices, different times of day, different locations, etc.

If it is determined that the detected difference does not exceed the threshold, then no event is detected, and the example process 800 completes, as in 806. If it is determined that the difference does exceed a threshold, it is determined that an event, such as an item pick or an item place, has occurred within the field of view of the imaging device, and an event notification is generated, as in 810. The event notification may be provided to one or more other services to determine the item and/or agent involved in the detected event.

The described implementations, provide a technologically improved system, method, and apparatus for event detection by substantially eliminating motion from HDR images to allow for a computationally efficient comparison of two or more motion extracted HDR images to determine if an event, such as an item pick or an item place, has occurred. Prior systems were required to perform additional processing to distinguish between events and objects moving within the field of view of the imaging device and the moving object often resulted in false event detection.

Figure 9:
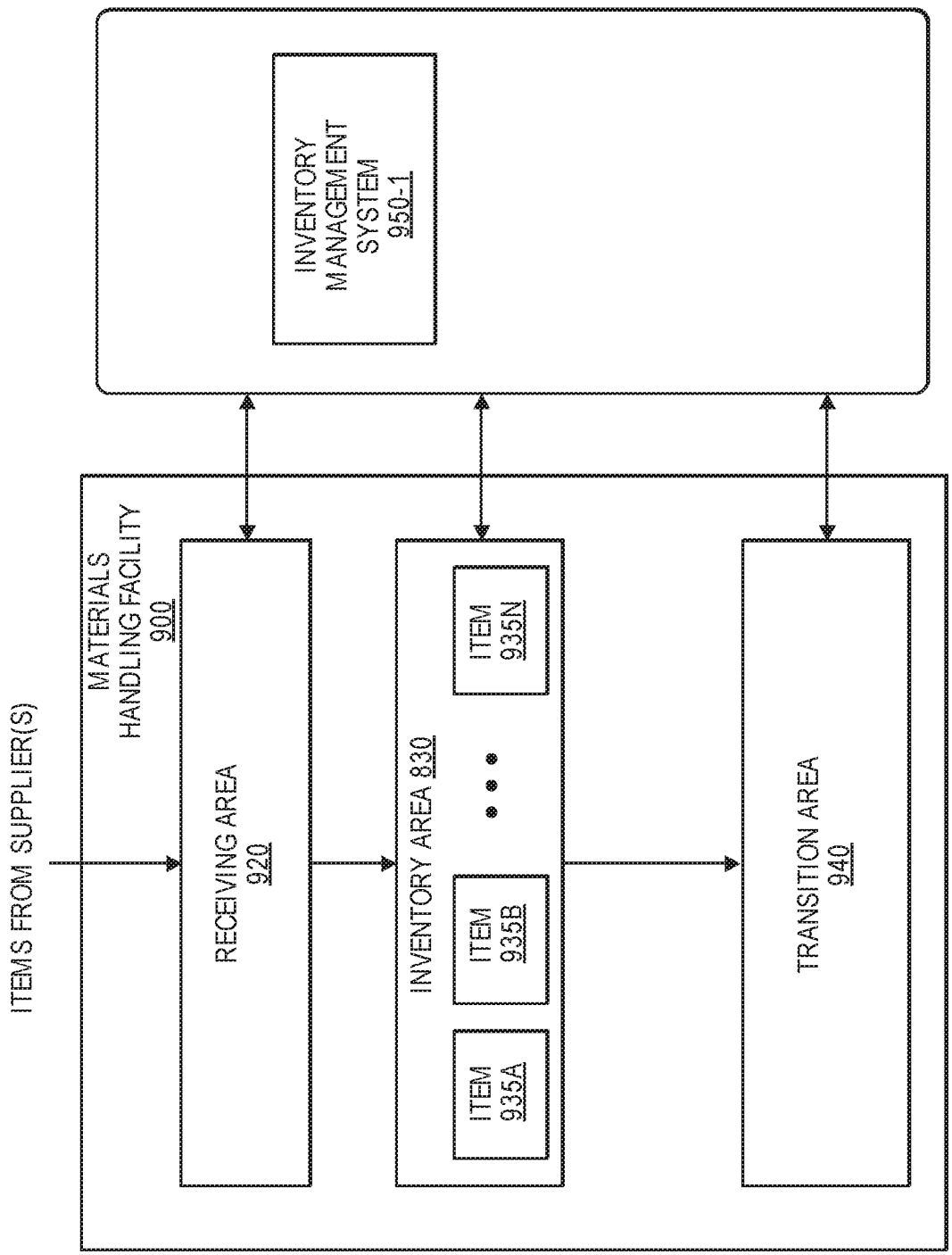
FIG. 9 is a block diagram illustrating a materials handling facility, in accordance with described implementations.

FIG. 9 illustrates a block diagram of a materials handling facility configured to store and manage inventory items, in accordance with the described implementations. As shown, a materials handling facility 900 includes a receiving area 920, an inventory area 930 configured to store an arbitrary number of inventory items 935A-935N, and one or more transition areas 940. The arrangement of the various areas within materials handling facility 900 is depicted functionally rather than schematically. For example, in some implementations, multiple different receiving areas 920, inventory areas 930 and/or transition areas 940 may be interspersed rather than segregated. Additionally, the materials handling facility 900 includes an inventory management service 950 configured to interact with each of receiving area 920, inventory area 930, transition area 940 and/or agents within the materials handling facility 900.

The materials handling facility 900 may be configured to receive different kinds of inventory items 935 from various suppliers and to store them until an agent retrieves one or more of the items. The general flow of items through the materials handling facility 900 is indicated using arrows. Specifically, as illustrated in this example, items 935 may be received from one or more suppliers, such as manufacturers, distributors, wholesalers, etc., at receiving area 920. In various implementations, items 935 may include merchandise, commodities, perishables, or any suitable type of item depending on the nature of the enterprise that operates the materials handling facility 900.

Upon being received from a supplier at receiving area 920, items 935 may be prepared for storage. For example, in some implementations, items 935 may be unpacked or otherwise rearranged and the inventory management service (which, as described, may include one or more software applications executing on a computer system) may be updated to reflect the type, quantity, condition, cost, location or any other suitable parameters with respect to newly received items 935. It is noted that items 935 may be stocked, managed or dispensed in terms of countable, individual units or multiples of units, such as packages, cartons, crates, pallets or other suitable aggregations. Alternatively, some items 935, such as bulk products, commodities, etc., may be stored in continuous or arbitrarily divisible amounts that may not be inherently organized into countable units. Such items 935 may be managed in terms of measurable quantities, such as units of length, area, volume, weight, or other dimensional properties characterized by units of measurement. Generally speaking, a quantity of an item 935 may refer to either a countable number of individual or aggregate units of an item 935 or a measurable amount of an item 935, as appropriate.

After arriving through receiving area 920, items 935 may be stored within inventory area 930 on an inventory shelf. In some implementations, like items 935 may be stored or displayed together in bins, on shelves or via other suitable storage mechanisms, such that all items 935 of a given kind are stored in one location. In other implementations, like items 935 may be stored in different locations. For example, to optimize retrieval of certain items 935 having high turnover or velocity within a large physical facility, those items 935 may be stored in several different locations to reduce congestion that might occur at a single point of storage.

When an order specifying one or more items 935 is received, or as an agent progresses through the materials handling facility 900, the corresponding items 935 may be selected or "picked" (an event) from the inventory area 930. For example, in one implementation, an agent may have a list of items to pick and may progress through the materials handling facility picking items 935 from the inventory area 930. In other implementations, an agent may pick items 935 using written or electronic pick lists derived from orders. In some instances, an item may need to be repositioned from one location within the inventory area 930 to another location. For example, in some instances, an item may be picked from its inventory location, moved a distance, and placed (an event) at another location. An "event," as used herein, is a detected movement of an item. For example, an event may be a detected movement of an item when the item is picked from an inventory location or a detected movement of an item when the item is placed at an inventory location.

As discussed herein, as the agent moves through the materials handling facility, images of the agent may be obtained and processed to determine an agent pattern representative of the agent and to track a position of the agent as the agent moves. Likewise, in some implementations, descriptors representative of the agent may be periodically determined for the agent from the obtained images as the agent moves about the materials handling facility. In addition, by generating motion extracted HDR images, images of stationary objects or areas may be easily monitored, as discussed herein.

Figure 10:
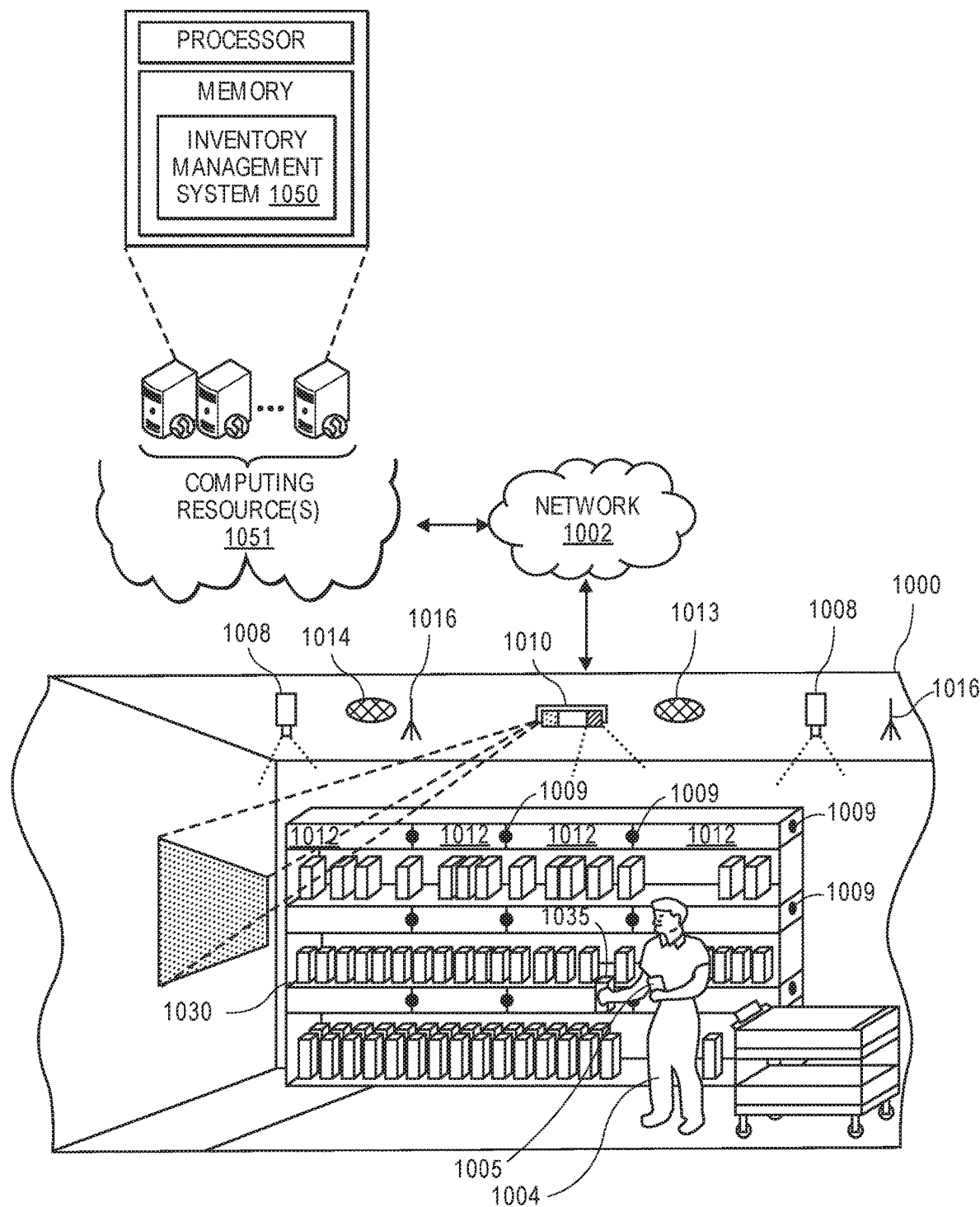
FIG. 10 shows additional components of the materials handling facility of FIG. 9, in accordance with described implementations.

FIG. 10 shows additional components of a materials handling facility 1000, according to one implementation. Generally, the materials handling facility 1000 may include one or more imaging devices 1008, 1009, such as cameras, some or all of which may include multiple aligned image sensors and corresponding lenses and/or may correspond to the imaging device discussed above with respect to FIG. 1. In some implementations, the overhead imaging devices 1008 may be positioned overhead, such as on the ceiling, and oriented toward a surface (e.g., floor) of the materials handling facility so that the overhead imaging devices 1008 are approximately perpendicular with the surface and the field of view is oriented toward the surface. The overhead imaging devices 1008 are used to capture images of agents and/or locations within the materials handling facility from an overhead or top-down view. Likewise, one or more side-view imaging devices 1009 may be positioned on, inside, or adjacent to inventory areas and/or otherwise positioned and oriented so that an inventory location is within a field of view of the side-view imaging device 1009. For example, a series of side-view imaging devices 1009 may be positioned on external portions of inventory areas and oriented to capture images of agents and/or other inventory locations (e.g., those on an opposite side of an aisle). In some implementations, side-view imaging devices 1009 may be arranged throughout the materials handling facility such that each inventory location is within a field of view of at least two side-view imaging devices 1009. Likewise, some or all of the side view imaging devices 1009 may be configured to include a computing component, as discussed above with respect to FIG. 1 and be capable of performing some or all of the implementations discussed herein. In such configurations, the output from the side-view imaging devices 1009 may be just the motion extracted HDR images. In other implementations, the side-view imaging devices may output the motion extracted HDR images and/or the series of time-sequenced images generated by the imaging device.

In addition to imaging devices, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, an RFID reader that can detect a tag included on an item as the item passes into or out of the inventory location may be utilized to detect the presence or absence of an item. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 1004 arrives at the materials handling facility 1000, one or more overhead images of the agent 1004 may be captured and processed using overhead imaging devices 1008 and/or the management service 1050. For example, images of the agent 1004 may be processed to identify the agent. This may be done using a variety of techniques, such as object recognition, pattern matching, etc. Generating HDR images, as discussed herein, of the agent as the agent moves through the facility, improves the ability to identify, track, and/or re-identify the agent between images because there is minimal or no loss of data due to overexposure or underexposure of regions of an image resulting from varying lighting conditions within the materials handling facility. In some implementations, rather than or in addition to processing images to identify the agent 1004, other techniques may be utilized to identify the agent. For example, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, etc.

In addition to establishing an agent pattern when the agent first arrives at the materials handling facility and is identified, one or more descriptors representative of the agent or the agent pattern may be determined. For example, one or more descriptor regions may be established, such as a torso region or a head region, and a descriptor representative of the region may be determined, stored in a descriptor data store and associated with the agent or the agent pattern while the agent is located in the materials handling facility. In some implementations, the determined agent patterns of the agent may be stored and maintained as representative of the agent and used at a later point in time to identify the agent (e.g., when the agent returns to the materials handling facility on a different date). In comparison, the descriptors may only be stored for a limited period of time and used to identify the agent during the current time they are in the materials handling facility. When the agent exits the materials handling facility, the descriptors may be discarded.

Returning to FIG. 10, in some implementations, an agent 1004 located in the materials handling facility 1000 may possess a portable device 1005 and obtain information about items located within the materials handling facility 1000, receive confirmation that the inventory management service has correctly identified items that are picked and/or placed by the agent 1004, receive requests for confirmation regarding one or more event aspects, etc. Generally, the portable device has at least a wireless module to facilitate communication with the management service 1050 (e.g., the inventory management service) and a display (e.g., a touch based display) to facilitate visible presentation to and interaction with the agent. The portable device 1005 may store a unique identifier and provide that unique identifier to the management service 1050 and be used to identify the agent 1004. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management service 1050. Likewise, components of the management service 1050 may interact and communicate with the portable device as well as identify the agent, communicate with the agent via other means and/or communicate with other components of the management service 1050.

Generally, the management service 1050 may include or communicate with one or more input/output devices, such as imaging devices (e.g., cameras) 1008, projectors 1010, displays 1012, speakers 1013, microphones 1014, illumination elements (e.g., lights), etc., to facilitate communication between the management service 1050 and/or the agent and detection of items, events and/or other actions within the materials handling facility 1000. In some implementations, multiple input/output devices may be distributed within the materials handling facility 1000. For example, there may be multiple imaging devices, such as imaging devices located on the ceilings (overhead cameras) and/or cameras (such as pico-cameras) located in the aisles near the inventory items (side-view cameras).

Likewise, the management service 1050 may also include one or more communication devices, such as wireless antennas 1016, which facilitate wireless communication (e.g., Wi-Fi, Near Field Communication (NFC), Bluetooth) between the management service 1050 and other components or devices. The management service 1050 may also include one or more computing resource(s) 1051, such as a server system, that may be local to the environment (e.g., materials handling facility), remote from the environment, or any combination thereof.

The management service 1050 may utilize antennas 1016 within the materials handling facility 1000 to create a network 1002 (e.g., Wi-Fi) so that the components and devices can connect to and communicate with the management service 1050. For example, when the agent picks an item 1035 from an inventory area 1030, image data from an imaging device may be transformed to the global color space and processed to detect the removal of the item and the management service 1050 may receive information, such as image data of the performed action (item pick from the inventory area), identifying that an item has been picked from the inventory area 1030. The event aspects (e.g., agent identity, action performed, item involved in the event) may then be determined by the management service 1050.

Figure 11:
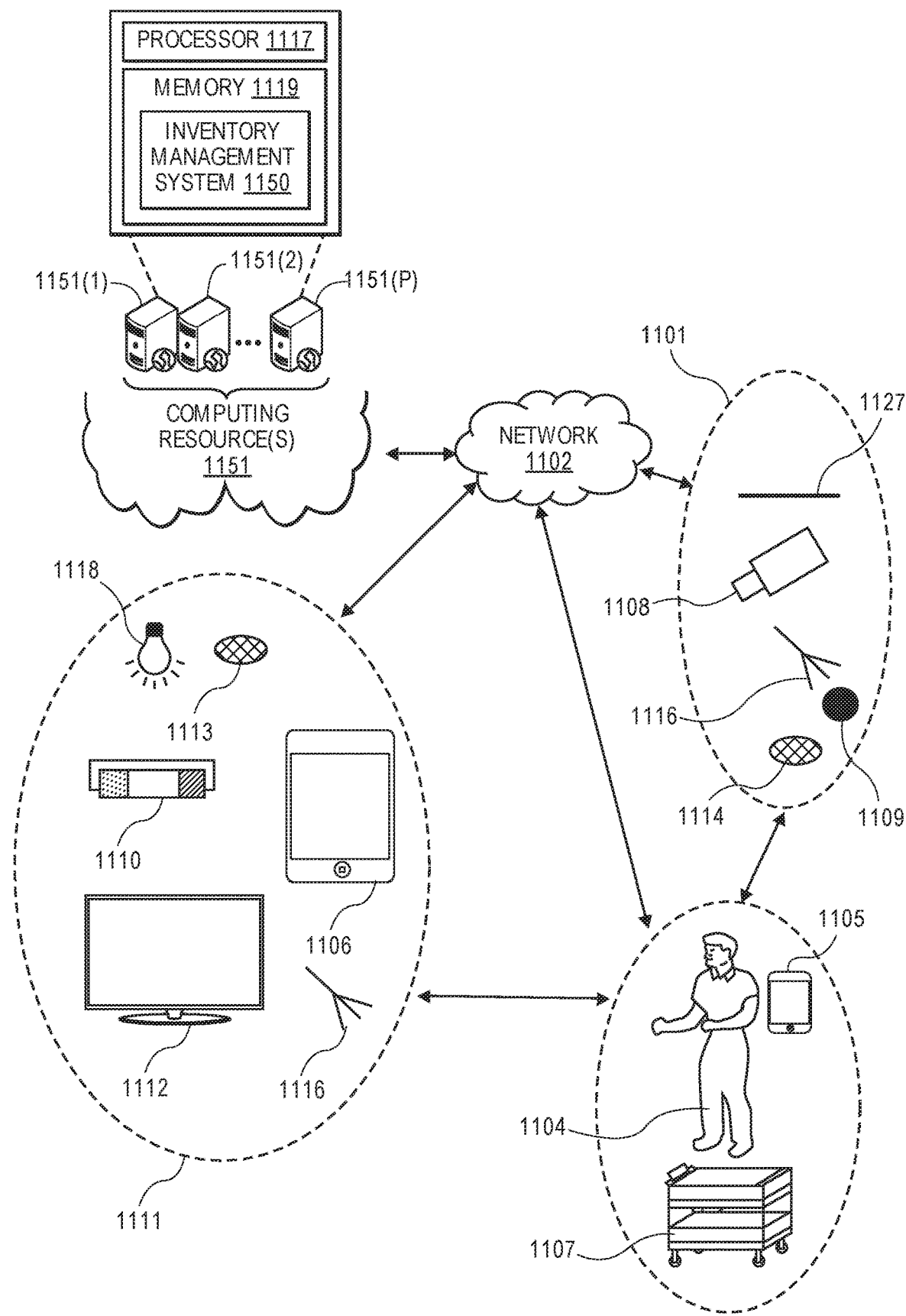
FIG. 11 shows components and communication paths between component types utilized in a materials handling facility of FIG. 9, in accordance with described implementations.

FIG. 11 shows example devices and communication paths between device types utilized in a materials handling facility, according to described implementations. A portable device 1105 may communicate and interact with various devices over a variety of communication paths. Generally, the system may include input components 1101, output components 1111 and computing resource(s) 1151. The input components 1101 may include an overhead imaging device 1108, side-view imaging device 1109, a multiple-device apparatus 1127, microphone 1114, antenna 1116, or any other device or component that is capable of receiving input about the surrounding environment and/or from the agent. The output components 1111 may include a projector 1110, a portable device 1106, a display 1112, an antenna 1116, a radio, speakers 1113, illumination sources 1118 (e.g., lights), and/or any other device or component that is capable of providing output to the surrounding environment and/or the agent.

The system may also include computing resource(s) 1151. The computing resource(s) 1151 may be local to the environment (e.g., materials handling facility), remote from the environment, or any combination thereof. Likewise, the computing resource(s) 1151 may be configured to communicate over a network 1102 with input components 1101, output components 1111 and/or directly with the portable device 1105, an agent 1104 and/or a tote 1107.

As illustrated, the computing resource(s) 1151 may be remote from the environment and implemented as one or more servers 1151(1), 1151(2), . . . , 1151(P) and may, in some instances, form a portion of a network-accessible computing platform implemented as a computing infrastructure of processors, storage, software, data access, and so forth that is maintained and accessible by components/devices of the system materials handling facility and/or the portable device 1105 via a network 1102, such as an intranet (e.g., local area network), the Internet, etc. The computing resources 1151 may process images of agents to identify the agent, process images of items to identify items, determine a location of items, determine a position of items, and the like. The server system(s) 1151 does not require end-agent knowledge of the physical location and configuration of the system that delivers the services. Common expressions associated for these remote computing resource(s) 1151 include "on-demand computing," "software as a service (SaaS)," "platform computing," "network-accessible platform," "cloud services," "data centers," and so forth.

Each of the servers 1151(1)-(P) include a processor 1117 and memory 1119, which may store or otherwise have access to management service 1150, which may include or provide image processing (e.g., for agent identification, item identification, etc.), inventory tracking, and/or location determination.

The network 1102 may utilize wired technologies (e.g., wires, USB, fiber optic cable, etc.), wireless technologies (e.g., radio frequency, infrared, NFC, cellular, satellite, Bluetooth, etc.), or other connection technologies. The network 1102 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The various sensors and computer systems described above may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

Figure 12:
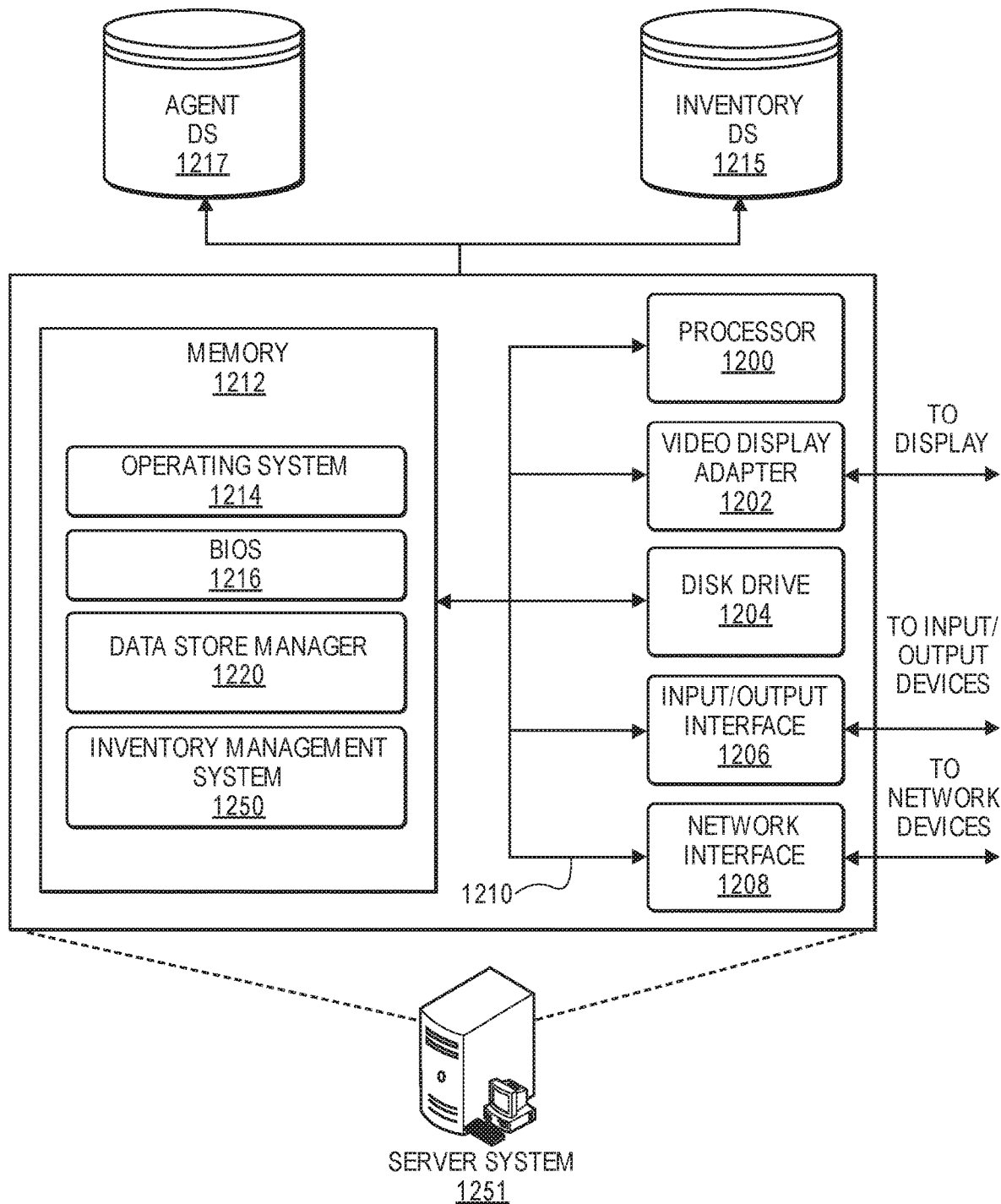
FIG. 12 is a block diagram of an illustrative implementation of a server system that may be used with various implementations.

FIG. 12 is a pictorial diagram of an illustrative implementation of a server system 1251, that may be used in the implementations described herein. The server system illustrated in FIG. 12, or another similar server system, may be configured as the management service (e.g., inventory management service).

The server system 1251 may include a processor 1200, such as one or more redundant processors, a video display adapter 1202, a disk drive 1204, an input/output interface 1206, a network interface 1208, and a memory 1212. The processor 1200, the video display adapter 1202, the disk drive 1204, the input/output interface 1206, the network interface 1208, and the memory 1212 may be communicatively coupled to each other by a communication bus 1210.

The video display adapter 1202 provides display signals to a local display permitting an operator of the server system 1251 to monitor and configure operation of the server system 1251. The input/output interface 1206 likewise communicates with external input/output devices, such as a mouse, keyboard, scanner, or other input and output devices that can be operated by an operator of the server system 1251. The network interface 1208 includes hardware, software, or any combination thereof, to communicate with other computing devices. For example, the network interface 1208 may be configured to provide communications between the server system 1251 and other computing devices via a network, such as the network shown in FIG. 11.

The memory 1212 generally comprises random access memory (RAM), read-only memory (ROM), flash memory, and/or other volatile or permanent memory. The memory 1212 is shown storing an operating system 1214 for controlling the operation of the server system 1251. A binary input/output system (BIOS) 1216 for controlling the low-level operation of the server system 1251 is also stored in the memory 1212.

The memory 1212 additionally stores program code and data for providing network services. The data store manager application 1220 facilitates data exchange between the inventory data store 1215 and the agent profile data store 1217.

As used herein, the term "data store" refers to any device or combination of devices capable of storing, accessing and retrieving data which may include any combination and number of data servers, databases, data storage devices and data storage media in any standard, distributed or clustered environment. The server system 1251 can include any appropriate hardware and software for integrating with the data stores 1215, and 1217 as needed to execute aspects of the management service 1250.

The data stores 1215 and 1217 can include several separate data tables, databases or other data storage mechanisms and media for storing data relating to a particular aspect. For example, the data stores 1215 and 1217 illustrated include mechanisms for maintaining inventory information (e.g., item locations, images of item when properly positioned, depth map information for an item located on an inventory shelf, item features), agent profile information, agent pattern information, correlations between imaging devices and real-world positions, etc.

It should be understood that there can be many other aspects that may be stored in the data stores 1215 and 1217. The data stores 1215 and 1217 are operable, through logic associated therewith, to receive instructions from the server system 1251 and obtain, update or otherwise process data in response thereto.

The memory 1212 may also include the inventory management service 1250. The management service 1250 may be executable by the processor 1200 to implement one or more of the functions of the server system 1251. In one implementation, the management service 1250 may represent instructions embodied in one or more software programs stored in the memory 1212. In another implementation, the management service 1250 can represent hardware, software instructions, or a combination thereof.

It will be appreciated by those of ordinary skill in the art that such a system could operate equally well in a system having fewer or a greater number of components than are illustrated in FIG. 12. Thus, the depiction in FIG. 12 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, image processing, and/or inventory management should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method, comprising:
   receiving, from an image sensor, first image data generated at a first time;
   receiving, from the image sensor, second image data generated at a second time that is different than the first time;
   comparing at least a portion of the first image data with at least a portion of the second image data to determine a first pixel of the first image data corresponding to an object that has moved in position between the first time and the second time; and
   generating a motion extracted image in which the moving object is eliminated from the motion extracted image by at least:
      extracting the first pixel from the first image data; and
      including a second pixel from a baseline image to fill the extracted first pixel.

2. The method of claim 1, further comprising:
   computing a similarity between pairs of each of a first plurality of pixels of the first image data;
   assigning each similarity to a connection between each pair of the first plurality of pixels; and
   extracting a second plurality of pixels that are connected with connections assigned high similarity that connect back to the first pixel.

3. The method of claim 1, further comprising:
   combining image data of the motion extracted image with at least a portion of a third image data of a third image.

4. The method of claim 1, further comprising:
   comparing a third pixel of a third image data with a fourth pixel of a fourth image data to determine a third similarity between the third pixel and the fourth pixel;
   comparing a fifth pixel of the third image data with a sixth pixel of the third image data to determine a fourth similarity between the fifth pixel and the sixth pixel;
   generating a second motion extracted image by at least:
      extracting the fourth pixel from the third image data; and
      including a sixth pixel from the baseline image to fill the extracted fifth pixel.

5. The method of claim 4, further comprising:
   comparing the motion extracted image with a second motion extracted image to determine a difference between the motion extracted image and the second motion extracted image, wherein the motion extracted image and the second motion extracted image are each representative of an inventory location; and generating, based at least in part on the difference, an event notification indicating that an event has been detected at the inventory location.

6. The method of claim 1, wherein the second pixel from the baseline image is known to be substantially devoid of a representation of a moving object.

7. The method of claim 1, further comprising:
for each pixel of the first image data:
comparing the pixel with an adjacent pixel to determine a similarity indicating a similarity between the pixel and the adjacent pixel;
assigning the determined similarity to a connection between the pixel and the adjacent pixel; and
wherein generating the motion extracted image is based at least in part on the similarity assigned to each connection.

8. The method of claim 1, wherein comparing at least a portion of the first image data with at least a portion of the second image data, further includes:
comparing a first depth value of a first pixel with a second depth value of a second pixel; or
comparing a first color value of the first pixel with a second color value of the second pixel.

9. A computing system, comprising:
one or more processors; and
a memory storing program instructions that when executed by the one or more processors cause the one or more processors to at least:
receive first image data obtained at a first time, at a first exposure, and representative of an inventory location;
receive, from an imaging sensor, second image data obtained at a second time, at the first exposure, and representative of the inventory location;
compare a first pixel included in the first image data with a corresponding pixel included in the second image data to determine that the first pixel represents a portion of a foreground object that has moved in position between the first time and the second time;
designate the first pixel as a foreground seed;
for each pixel of a plurality of pixels included in the first image data:
compare the pixel with an adjacent pixel of the first image data to determine a similarity between the pixel and the adjacent pixel; and
associate the similarity with a connection between the pixel and the adjacent pixel;
extract, based at least in part on the similarities associated with the connections, the foreground seed and a first plurality of pixels having connections with high similarities that connect back to the foreground seed;
include a second plurality of pixels from a baseline image to fill the extracted foreground seed and the first plurality of pixels to form a motion extracted image; and
output the motion extracted image.

10. The computing system of claim 9, when the program instructions when executed by the one or more processors further cause the one or more processors to at least:
compare a second pixel included in the first image data with a second corresponding pixel included in the second image data to determine that the second pixel represents a stationary object; and
designate the second pixel as a background seed.

11. The computing system of claim 10, when the program instructions when executed by the one or more processors further cause the one or more processors to at least:
determine a third plurality of pixels having strong connections back to the foreground seed;
determining a fourth plurality of pixels having strong connections back to the background seed; and
wherein the program instructions that when executed by the one or more processors to cause the one or more processors to extract, further include instructions, that when executed by the one or more processors, further cause the one or more processors to separate the pixels such that the third plurality of pixels are extracted with the foreground seed and the fourth plurality of pixels remain with the background seed.

12. The computing system of claim 9, wherein the program instructions that, when executed by the one or more processors to cause the one or more processors to compare the pixel with an adjacent pixel further include instructions that, when executed by the one or more processors, further cause the one or more processors to at least:
compare at least one of a first color value or a first depth value of the pixel with a second color value or a second depth value of the adjacent pixel to determine the similarity.

13. The computing system of claim 9, wherein the program instructions that when executed by the one or more processors further cause the one or more processors to at least:
compare the motion extracted image with a second motion extracted image to determine a difference between the motion extracted image and the second motion extracted image, wherein the motion extracted image and the second motion extracted image are each representative of an inventory location; and
generate, based at least in part on the difference, an event notification indicating that an event has been detected at the inventory location.

14. The computing system of claim 9, wherein the program instructions that when executed by the one or more processors further cause the one or more processors to at least:
compare a first depth value of a first pixel with a second depth value of a second pixel; or
compare a first color value of the first pixel with a second color value of the second pixel.

15. A computer implemented method, comprising:
receiving, from an image sensor, first image data generated at a first time and a first exposure;
receiving, from the image sensor, second image data generated at a second time that is different than the first time;
comparing at least a portion of the first image data and at least a portion of the second image data to determine a foreground seed pixel of the first image data corresponding to an object that has moved in position between the first time and the second time;
for each pair of adjacent pixels of the first image data, creating a connection between the pair based on a similarity score indicating a similarity of the pair;
processing the first image data to determine, for each connection between each adjacent pixel of a first plurality of pixels included in the first image data, a similarity score indicating a similarity between the adjacent pixels;

determining, based at least in part on the similarity scores:
- a first plurality of strong connections between adjacent pixels; and
- a second plurality of weak connections between adjacent pixels;

extracting, from the first image data, the foreground seed pixel and pixels having a strong connection back to the foreground seed pixel, such that a second plurality of pixels representative of the object that moved in position between the first time and the second time are extracted; and including a third plurality of pixels from a baseline image to fill the extracted second plurality of pixels to form a motion extracted image.

16. The computer implemented method of claim 15, further comprising
- selecting a first pixel included in the first image data; and
- comparing the first pixel with a second pixel that is adjacent the first pixel of the first image data to determine a first similarity between the first pixel and the second pixel, wherein the comparison of the first pixel with the second pixel includes a comparison of at least one of color values or depth values.

17. The computer implemented method of claim 15, further comprising:
- determining a background seed pixel corresponding to an object that is stationary between the first time and the second time.

18. The computer implemented method of claim 17, further comprising:
- determining a third plurality of pixels having strong connections back to the foreground seed pixel;
- determining a fourth plurality of pixels having strong connections back to the background seed pixel; and
- wherein extracting includes separating the pixels such that the third plurality of pixels are extracted with the foreground seed pixel and the fourth plurality of pixels remain with the background seed pixel.

19. The computer implemented method of claim 15, further comprising:
- determining a plurality of foreground seed pixels corresponding to one or more objects that have moved in position between the first time and the second time; and
- wherein extracting further includes:
  - extracting, from the first image data, each of the plurality of foreground seed pixels and all pixels having a strong connection back to at least one of the plurality of foreground seed pixels, such that pixels representative of the one or more objects that moved in position between the first time and the second time are extracted.

20. The computer implemented method of claim 15, wherein the second plurality of pixels from the baseline image is known to be substantially devoid of a representation of a moving object.

* * * * *